US012083797B2

(12) United States Patent
Maruyama et al.

(10) Patent No.: US 12,083,797 B2
(45) Date of Patent: Sep. 10, 2024

(54) LIQUID EJECTION MODULE AND LIQUID EJECTION HEAD

(71) Applicant: CANON KABUSHIKI KAISHA, Tokyo (JP)

(72) Inventors: Ayako Maruyama, Kanagawa (JP); Yoshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/343,673

(22) Filed: Jun. 28, 2023

(65) Prior Publication Data

US 2023/0339228 A1 Oct. 26, 2023

Related U.S. Application Data

(63) Continuation of application No. 17/339,794, filed on Jun. 4, 2021, now Pat. No. 11,724,495.

(30) Foreign Application Priority Data

Jun. 11, 2020 (JP) ................................ 2020-101658

(51) Int. Cl.
*B41J 2/14* (2006.01)

(52) U.S. Cl.
CPC ......... *B41J 2/1404* (2013.01); *B41J 2/14088* (2013.01); *B41J 2/14145* (2013.01); *B41J 2202/12* (2013.01)

(58) Field of Classification Search
CPC .. B41J 2/1404; B41J 2/14088; B41J 2/14145; B41J 2202/12
See application file for complete search history.

(56) References Cited

U.S. PATENT DOCUMENTS 11,724,495 B2 * 8/2023 Maruyama ........... B41J 2/14145 347/1

* cited by examiner

*Primary Examiner* — Geoffrey S Mruk
(74) *Attorney, Agent, or Firm* — Canon U.S.A., Inc. IP Division

(57) ABSTRACT

Provided is a liquid ejection module capable of enhancing the strength of an orifice plate while achieving favorable ejection operation at each ejection port. To that end, the liquid ejection module includes a functional layer in which a plurality of energy generating elements are arranged, a flow channel forming layer in which pressure chambers, individual flow channels, and a common flow channel are formed, and an orifice plate having ejection ports formed therein. The functional layer, the flow channel forming layer and the orifice plate are stacked. In the flow channel forming layer, a beam is formed, extending from a flow channel wall of the common flow channel toward the individual flow channels and supporting the orifice plate in a region facing a first opening.

17 Claims, 18 Drawing Sheets

| | CONFIGURATION IN FIGS. 3A AND 3B | CONFIGURATION IN FIGS. 4A AND 4B (FIRST EMBODIMENT) | CONFIGURATION IN FIGS. 5A AND 5B |
|---|---|---|---|
| STRESS RATIO | 1.0 | 0.7 | 0.9 |
| FLOW RATE RATIO | 1.00 | 0.98 | 0.97 |

FIG.6

| | CONFIGURATION WITHOUT BEAMS | CONFIGURATION WITH BEAMS 26 | CONFIGURATION WITH BEAMS 27 |
|---|---|---|---|
| STRESS RATIO | 1.00 | 0.61 | 0.58 |

FIG.12

| | FLOW VELOCITY RATIO |
|---|---|
| FLOW IN THROUGH OPENINGS 8, FLOW OUT THROUGH OPENINGS 9 | 0.94 |
| FLOW IN THROUGH OPENINGS 9, FLOW OUT THROUGH OPENINGS 8 | 0.90 |

FIG.13

LIQUID EJECTION MODULE AND LIQUID EJECTION HEAD

CROSS-REFERENCE TO RELATED APPLICATIONS

The present application is a continuation of U.S. patent application Ser. No. 17/339,794, filed on Jun. 4, 2021, issued as U.S. Pat. No. 11,724,495 on Aug. 15, 2023, which claims priority from Japanese Patent Application No. 2020-101658 filed Jun. 11, 2020, which are hereby incorporated by reference herein in their entireties.

BACKGROUND OF THE INVENTION

Field of the Disclosure

The present disclosure generally relates to a liquid ejection module and a liquid ejection head capable of ejecting liquid such as ink.

Description of the Related Art

In liquid ejection heads used in inkjet printing apparatuses and the like, the size of liquid droplets is getting smaller, and the density of ejection ports for ejecting liquid is getting higher. Japanese Patent Laid-Open No. 2018-108691 discloses a configuration in which the strength of an orifice plate where a large number of ejection ports are densely disposed is enhanced by provision of pillars in a flow channel for leading liquid to individual ejection ports.

SUMMARY

In a first aspect of the present disclosure, there is provided a liquid ejection module comprising: a functional layer which has formed therein a plurality of energy generating elements arranged in a first direction and a first opening disposed at a position apart from a row of the plurality of energy generating elements in a second direction which intersects with the first direction; a flow channel forming layer which is provided on the functional layer and has formed therein a plurality of pressure chambers disposed at positions corresponding to the respective energy generating elements, first individual flow channels which communicate with the respective pressure chambers, and a first common flow channel which communicates with the first opening and connects to the plurality of first individual flow channels in a shared manner; and an orifice plate which is provided on the flow channel forming layer and has formed therein a plurality of ejection ports that communicate with the respective pressure chambers, wherein liquid supplied through the first opening passes through the first common flow channel and the first individual flow channels, is disposed in the pressure chambers, and is ejected from the ejection ports in response to an application of voltage to the respective energy generating element, wherein in the first common flow channel of the flow channel forming layer, a beam is formed which extends in the second direction from a flow channel wall of the first common flow channel toward the first individual flow channels and supports the orifice plate in a region facing the first opening.

In a second aspect of the present disclosure, there is provided a liquid ejection head in which a plurality of liquid ejection modules are arranged in a first direction, each of the liquid ejection modules comprising: a functional layer which has formed therein a plurality of energy generating elements arranged in the first direction and a first opening disposed at a position apart from a row of the plurality of energy generating elements in a second direction which intersects with the first direction; a flow channel forming layer which is provided on the functional layer and has formed therein a plurality of pressure chambers disposed at positions corresponding to the respective energy generating elements, first individual flow channels which communicate with the respective pressure chambers, and a first common flow channel which communicates with the first opening and connects to the plurality of first individual flow channels in a shared manner; and an orifice plate which is provided on the flow channel forming layer and has formed therein a plurality of ejection ports that communicate with the respective pressure chambers, the liquid ejection module being configured such that liquid supplied through the first opening passes through the first common flow channel and the first individual flow channels, is disposed in the pressure chambers, and is ejected from the ejection ports in response to an application of voltage to the respective energy generating element in accordance with ejection data, wherein in the first common flow channel of the flow channel forming layer, a beam is formed which extends in the second direction from a flow channel wall of the first common flow channel toward the first individual flow channels and supports the orifice plate in a region facing the first opening.

Further features of the present disclosure will become apparent from the following description of exemplary embodiments with reference to the attached drawings.

BRIEF DESCRIPTION OF THE DRAWINGS

FIG. 6 is a diagram comparing stress ratios and flow rate ratios;

FIG. 12 is a diagram comparing stress ratios of stress exerted on a facing region;

FIG. 13 is a diagram showing the relation between the direction of flow in the element substrate and flow velocity ratio;

DESCRIPTION OF THE EMBODIMENTS

In the configuration of Japanese Patent Laid-Open No. 2018-108691, the pillars formed may hinder the flow of liquid and lower ejection performance at each ejection port.

Aspects of the present disclosure address the above noted issue and provide a liquid ejection module and a liquid ejection head capable of enhancing the strength of an orifice plate while achieving favorable ejection operation at each ejection port.

First Embodiment

<Schematic Configuration of a Liquid Ejection Apparatus>

Figure 1A:
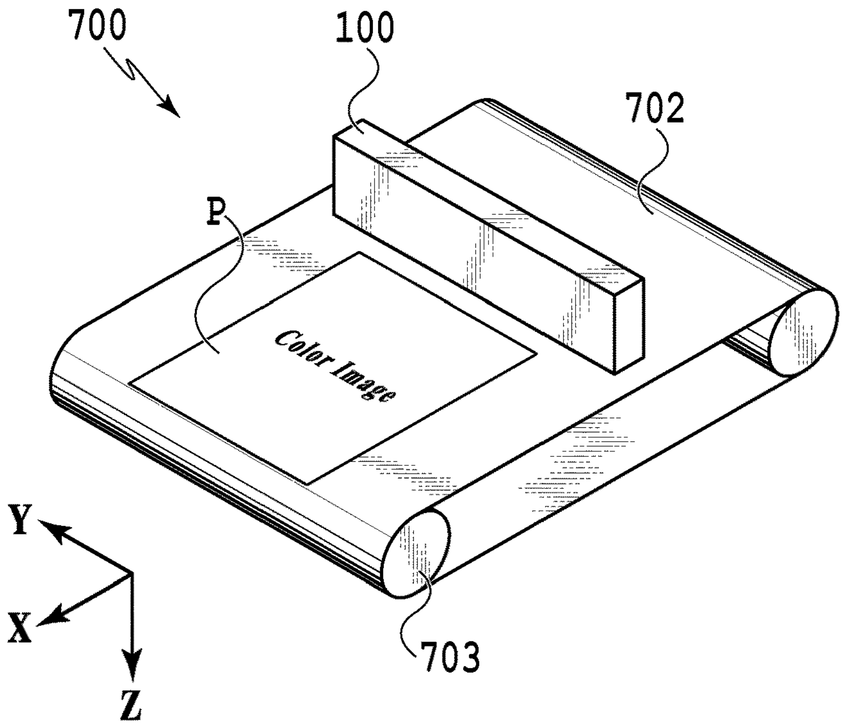
FIGS. 1A and 1B are a schematic configuration diagram and a control block diagram, respectively, of a printing unit of an inkjet printing apparatus.
Figure 1B:
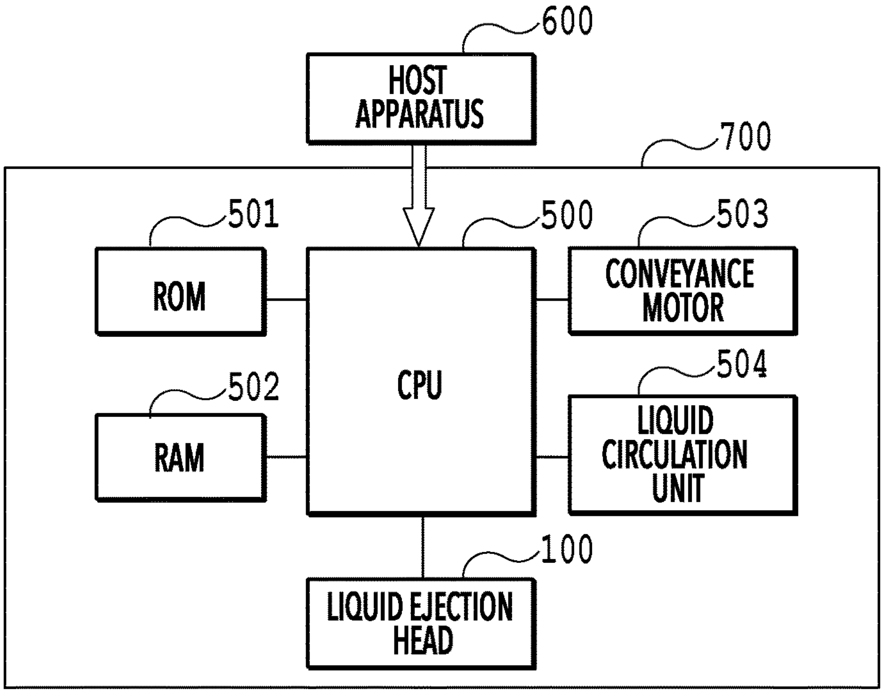

FIGS. 1A and 1B are a schematic configuration diagram and a control block diagram, respectively, of a printing unit of an inkjet printing apparatus 700 (hereinafter simply referred to as a printing apparatus 700) usable as a liquid ejection apparatus of the present embodiment.

As shown in FIG. 1A, the printing apparatus 700 of the present embodiment is a full-line inkjet printing apparatus using a liquid ejection head 100 having a printing region corresponding to the width of a sheet P. In FIG. 1A, an X-direction denotes the direction in which the sheet P (a printing medium) is conveyed, a Y-direction denotes the width direction of the sheet P, and a Z-direction denotes the direction in which the ejection ports (not shown in FIG. 1A) disposed in the liquid ejection head 100 eject liquid. The sheet P is placed on a belt-like conveyance means 702 and is conveyed in the X-direction at a predetermined speed as conveyance rollers 703 rotate.

The liquid ejection head 100 including a plurality of ejection ports capable of ink ejection is disposed at some point along the conveyance path. The liquid ejection head 100 prints a desired image on the surface of the sheet P by ejecting ink from each ejection port in accordance with ejection data at a frequency corresponding to the conveyance speed of the sheet P.

FIG. 1B is a block diagram illustrating the control configuration of the printing apparatus 700. A CPU 500 performs overall control of the printing apparatus 700 in accordance with programs stored in a ROM 501 while using a RAM 502 as a work area.

For example, the CPU 500 performs predetermined image processing on image data received from a host apparatus 600 which is externally connected, in accordance with the programs and parameters stored in the ROM 501 and thereby generates ejection data that can be handled by the liquid ejection head 100. Then, the CPU 500 drives the liquid ejection head 100 in accordance with this ejection data and causes the liquid ejection head 100 to eject ink from each ejection port at a predetermined frequency. Further, while causing the liquid ejection head 100 to perform such ejection operation, the CPU 500 drives a conveyance motor 503 to rotate the conveyance rollers 703, thereby conveying the sheet P in the X-direction at a speed corresponding to the ejection frequency.

A liquid circulation unit 504 is a unit for circulating ink in the liquid ejection head 100. The liquid circulation unit 504 includes a pressure control unit, a switching mechanism, and the like, which are not shown, and is configured to supply ink to the liquid ejection head 100 under a predetermined pressure and collect ink unused by the liquid ejection head 100 from the liquid ejection head 100.

<Configuration of the Liquid Ejection Head>

Figure 2:
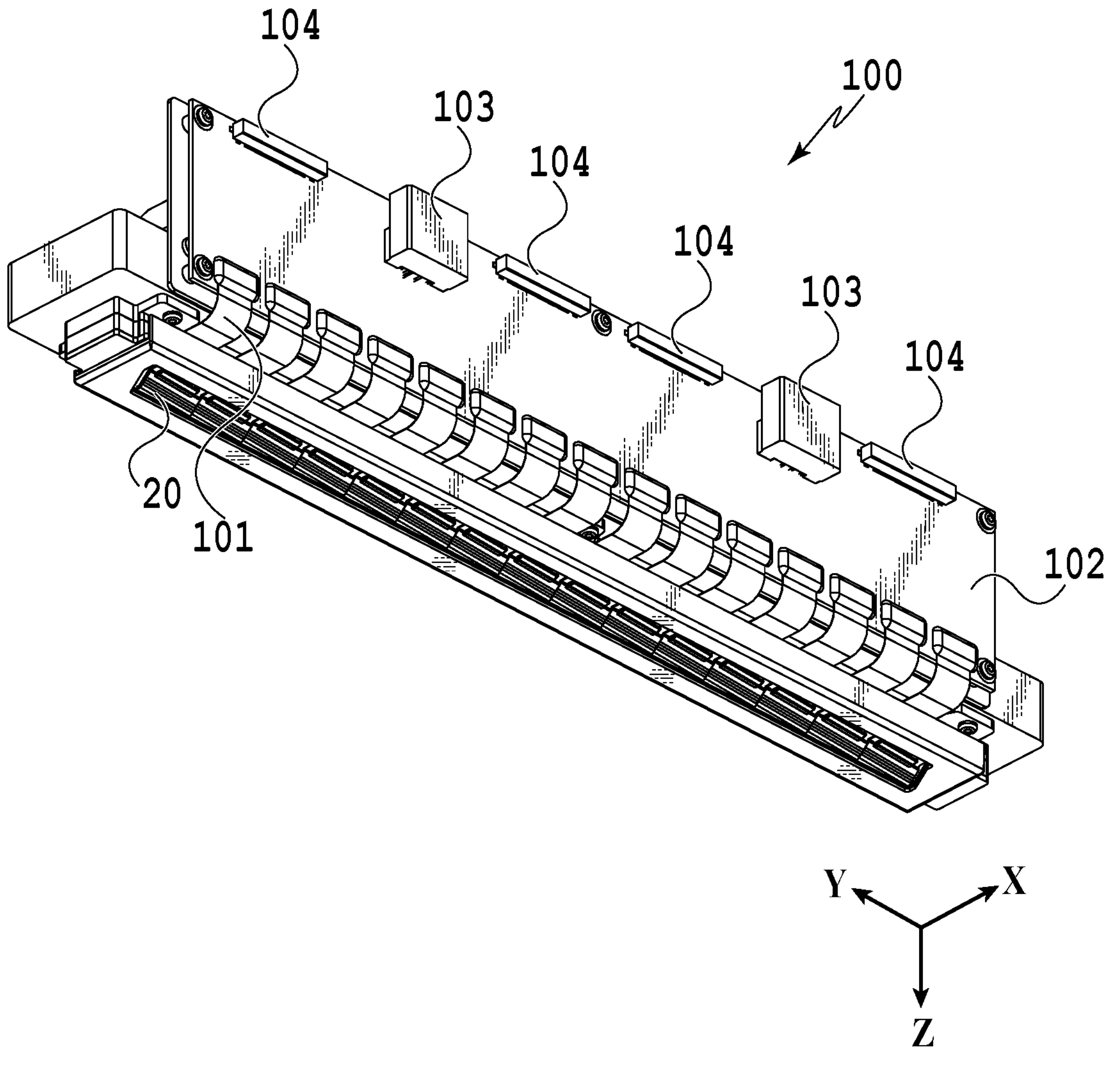
FIG. 2 is a perspective view of a liquid ejection head.

FIG. 2 is a perspective view of the liquid ejection head 100. The liquid ejection head 100 of the present embodiment is a full-line inkjet printing head and has chip-shaped element substrates 20 (liquid ejection modules) arranged in the Y-direction, as many as necessary to cover the A4-size width of paper for example. Besides the element substrates 20, the liquid ejection head 100 is provided with an electric wiring substrate 102 and a plurality of flexible wiring substrates 101 to connect each of the element substrates 20 to the electric wiring substrate 102. The electric wiring substrate 102 is provided with power supply terminals 103 for receiving power from the main body of the printing apparatus 700 and signal input terminals 104 for receiving ejection data. Mounted on the back of the electric wiring substrate 102 is part of the liquid circulation unit 504 for controlling ink circulation in the liquid ejection head 100.

<Typical Structure of the Element Substrate>

Figure 3A:
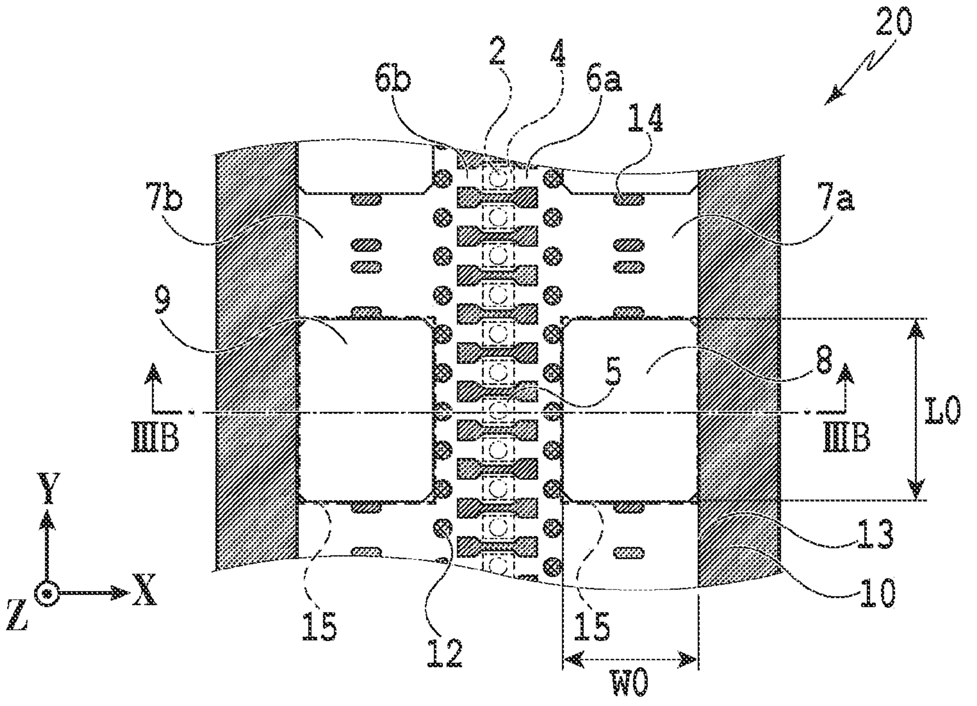
FIG.3A Prior Art
FIGS. 3A and 3B are enlarged views illustrating a typical structure of an element substrate.
Figure 3B:
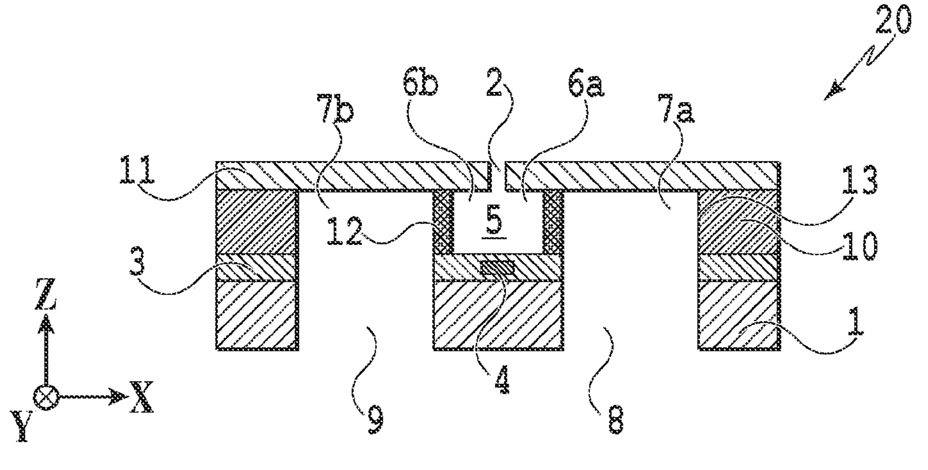
FIG.3B Prior Art

FIGS. 3A and 3B are enlarged views illustrating a typical structure of the element substrate 20 capable of ink circulation. FIG. 3A is a plan view seen from the ejection ports 2 side, and FIG. 3B is a sectional view. As shown in FIG. 3B, the element substrate 20 is configured such that a functional layer 3, a flow channel forming layer 10, and an orifice plate 11 are staked in this order on a substrate 1 made of e.g. silicon. The flow channel forming layer 10 and the orifice plate 11 may be made of the same material and integrally formed.

In the orifice plate 11, a plurality of ejection ports 2 are arranged in the Y-direction at a density of 1200 dpi (dots per inch), i.e., an interval of approximately 21 μm. As through-holes, liquid supply ports 8 through which liquid is supplied from the liquid circulation unit 504 (see FIG. 1B) and liquid discharge ports 9 through which liquid is discharged to the liquid circulation unit 504 are formed in the substrate 1, the functional layer 3, and the flow channel forming layer 10. The X-direction length W0 and the Y-direction length L0 of each liquid supply port 8 and each liquid discharge port 9 are 75 μm and 101 μm respectively. The liquid supply ports 8 and the liquid discharge ports 9 are arranged at a pitch of 151 pieces per inch in the Y-direction.

Formed in the flow channel forming layer 10 are pressure chambers 5 communicating with the respective ejection ports 2, individual flow channels **6*a* for individually supplying liquid to the respective pressure chambers 5, and individual flow channels 6*b* for individually discharging liquid from the respective pressure chamber 5. Also formed in the flow channel forming layer 10 are a common flow channel 7*a* for supplying liquid supplied through the liquid supply ports 8 to the plurality of individual flow channels 6*a* in a shared manner and a common flow channel 7*b* for discharging liquid from the individual flow channels 6*b* in a shared manner. The common flow channel 7*a* and the common flow channel 7*b* extend along the common flow channel walls 13 of the flow channel forming layer 10 in the Y-direction in parallel with the direction in which the ejection ports 2** are arranged.

In the common flow channels **7*a*, 7*b* which are basically hollow, some pillars 14 that connect the orifice plate 11 and the functional layer 3 to each other are provided to improve the overall strength of the orifice plate 11. Pillar-shaped filters 12 are provided between the common flow channel 7*a* and the individual flow channels 6*a* and between the common flow channel 7***b* and the individual flow channels 6*b* to prevent air bubbles and foreign matters from entering the pressure chambers 5.

In the functional layer 3, electro-thermal conversion elements 4 (hereinafter referred to as heaters 4) are provided at positions facing the respective ejection ports 2 to give heat energy to ink disposed in the pressure chambers 5. Wiring (not shown) is also formed in the functional layer 3 to supply ejection signals and power to each of the heaters 4.

Under the above configuration, liquid supplied from the liquid circulation unit 504 through the liquid supply ports 8 passes through the common flow channel 7*a* and then the individual flow channels 6*a* and is disposed in the pressure chambers 5. Then, film boiling is caused in the ink in the pressure chambers 5 in response to application of voltage to the heaters 4 in accordance with ejection data, and ink droplets are ejected from the ejection ports 2 due to the energy of the generated bubbles growing. Ink not ejected passes through the individual flow channels 6*b* and then the common flow channel 7*b* and is collected by the liquid circulation unit 504 through the liquid discharge ports 9.

In this way, the ink-circulating liquid ejection head 100 steadily circulates ink in the pressure chambers 5 using the liquid circulation unit 504. This allows fresh ink to be disposed in each of the pressure chambers 5 all the time irrespective of the ejection frequency and allows a favorable ejection state to be maintained.

The liquid supply ports 8 and the liquid discharge ports 9 are preferably large enough to be able to supply ink to all the pressure chambers 5 stably even in a case where all the heaters 4 are driven at an upper-limit drive frequency. On the other hand, the functional layer 3 needs to have a region for forming wiring as well, and the area occupied by the wiring increases according to the density of the heaters 4 arranged in the Y-direction. In a semiconductor process that manufactures a plurality of element substrates 20 collectively, it is desired that as many element substrates 20 as possible are laid out on a single wafer. Considering the above, in the present example, the liquid supply ports 8 and the liquid discharge ports 9 are each sized such that the X-direction length W0 and the Y-direction length L0 are 75 μm and 101 μm, respectively, and provided at a pitch of 151 pieces per inch in the Y-direction.

However, since the filters 12 and the pillars 14 cannot be provided in regions of the orifice plate 11 that face the liquid supply ports 8 and the liquid discharge ports 9, the regions are inevitably weaker than the other regions. FIG. 3A shows such regions that face the liquid supply port 8 and the liquid discharge port 9 with broken lines as facing regions 15. The larger the liquid supply port (first opening) 8 and the liquid discharge port (second opening) 9 are, the weaker the facing regions 15 become, making it more likely for the orifice plate 11 to break at the time of maintenance processing of the liquid ejection head 100. Specifically, wiping of the surface of the orifice plate 11 or pushing a cap member against the surface of the orifice plate 11 for suction operation may break the facing regions 15 because the facing regions 15 cannot resist the pressure applied by the wiping or the suction operation. To avoid this, in the present embodiment, beam structures capable of supporting the facing regions 15 are provided to the flow channel forming layer 10 to reinforce the facing regions 15.

Figure 4A:
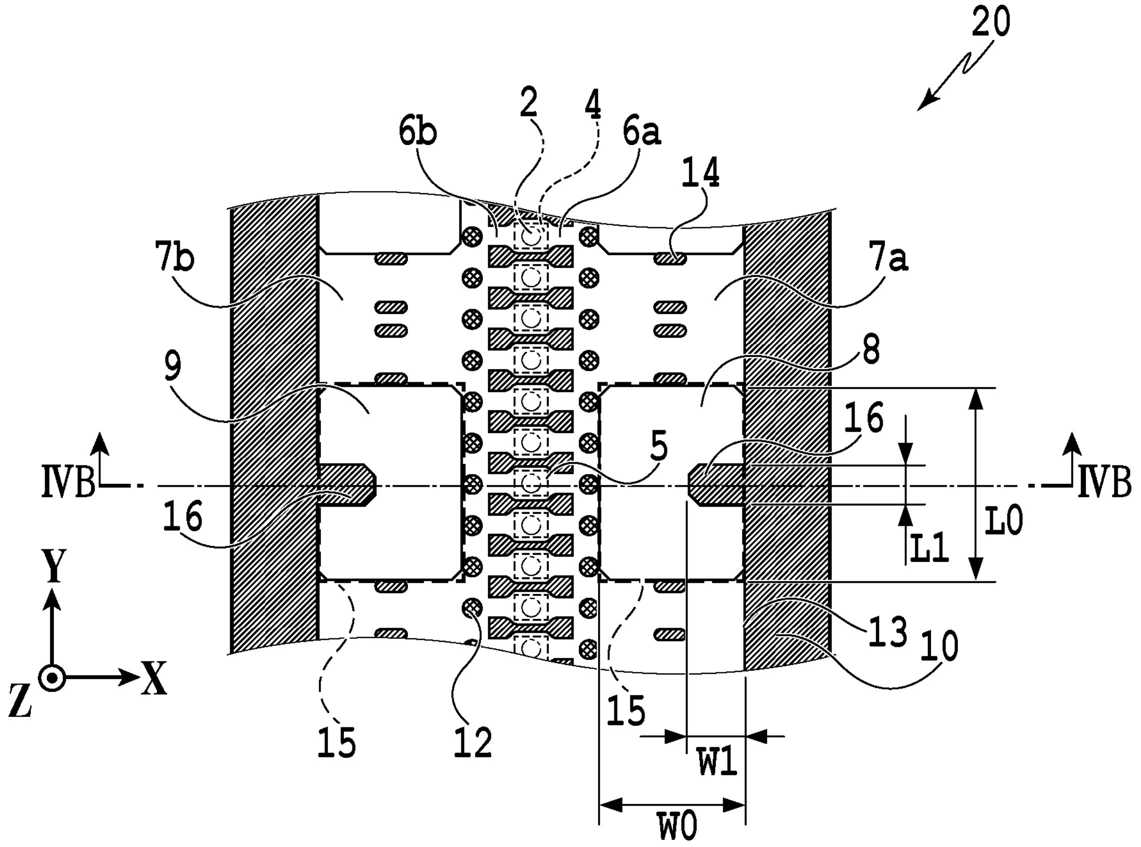
FIGS. 4A and 4B are diagrams illustrating the structure of an element substrate of a first embodiment.
Figure 4B:
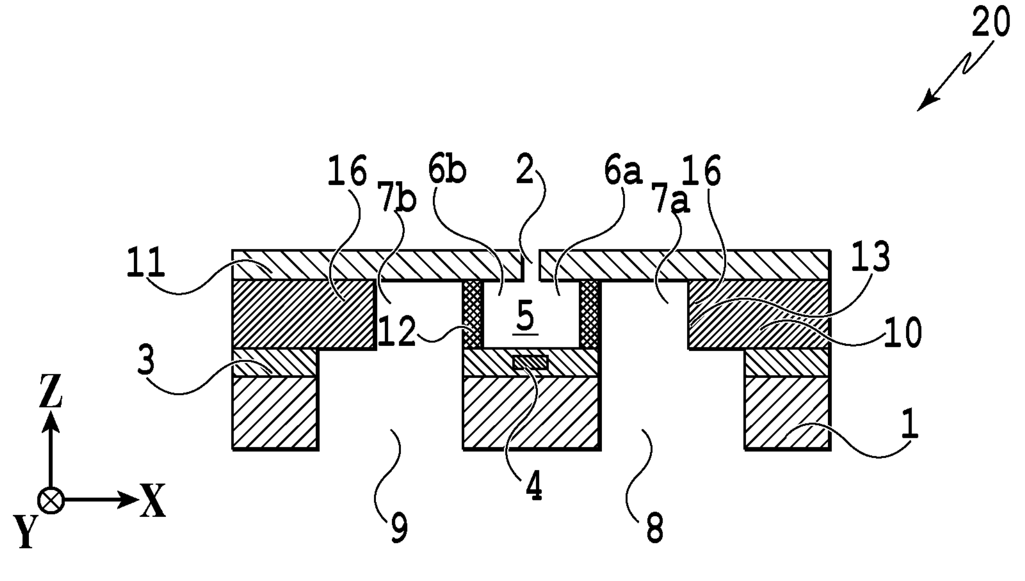

FIGS. 4A and 4B are diagrams illustrating the structure of the element substrate 20 of the present embodiment. FIG. 4A is a plan view seen from the ejection ports 2 side, and FIG. 4B is a sectional view. The same reference numerals as those in FIGS. 3A and 3B denote the same members as those in FIGS. 3A and 3B. The following describes differences from FIGS. 3A and 3B.

In the common flow channels 7*a* and 7*b* of the present embodiment, beams 16 are provided in part of regions corresponding to the facing regions 15. Each of the beams 16 is provided at almost the center of the facing region 15 in the Y-direction and extends in the X-direction from the common flow channel wall 13 toward the pressure chambers 5, supporting the orifice plate 11 in the Z-direction. The beam 16 may be formed of the same member as the flow channel forming layer 10 or may be formed of a member which is separate from the common flow channel wall 13 and is fixed to the common flow channel wall 13. In the present embodiment, the X-direction length W1 and the Y-direction length L1 of each beam 16 are 31 μm and 20 μm, respectively.

The beams 16 thus support the facing regions 15 of the orifice plate 11 which are not supported by the filters 12 or the pillars 14 and thereby can enhance the overall strength of the orifice plate 11, compared with the conventional configuration illustrated in FIGS. 3A and 3B.

Figure 5A:
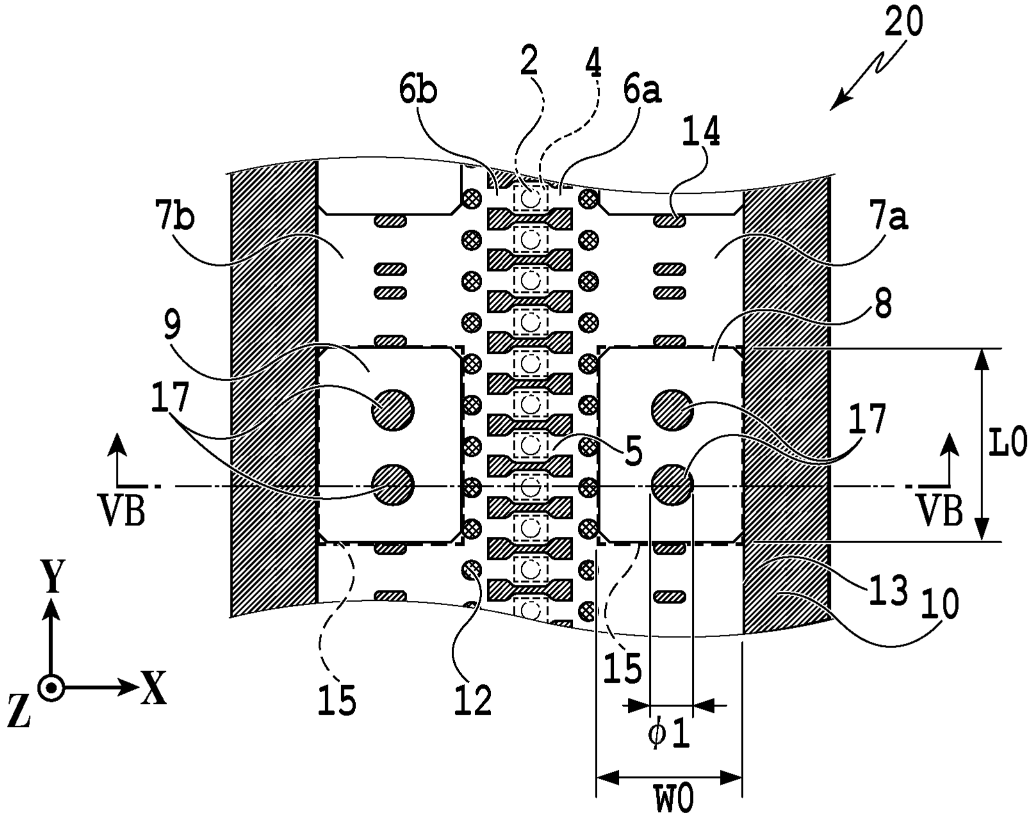
FIGS. 5A and 5B are diagrams illustrating the structure of an element substrate of a comparative example.
Figure 5B:
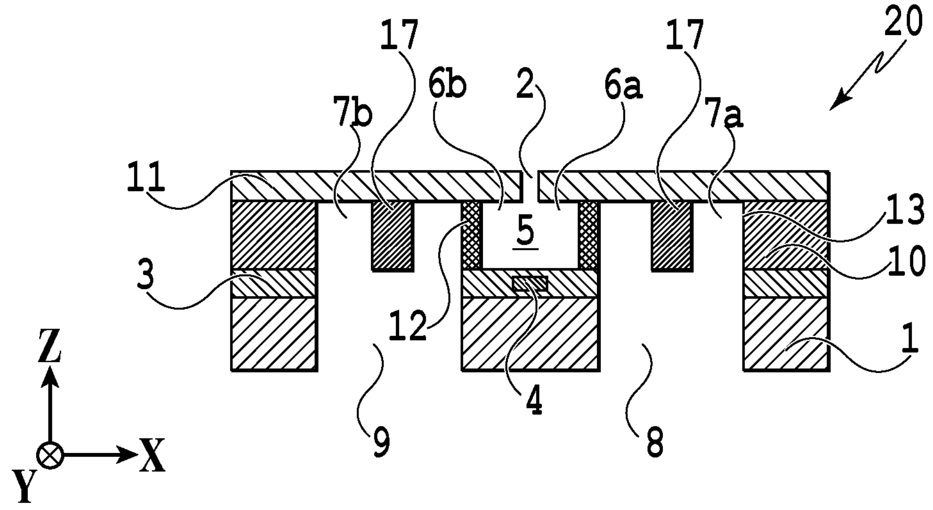

FIGS. 5A and 5B are diagrams showing a structure as a comparative example in which pillars 17 are provided in the common flow channels 7*a* and 7*b* as disclosed in Japanese Patent Laid-open No. 2018-108691. A difference from FIGS. 3A and 3B or FIGS. 4A and 4B is that two pillars 17 are provided in each of the facing regions 15, extending from the orifice plate 11 in the Z-direction. The two pillars 17 are provided at substantially the center of the facing region 15 in the X-direction at positions symmetric in the Y-direction across a center line, and support the orifice plate 11 in the Z-direction. The diameter φ1 of each pillar 17 is set to 20 μm so that the areas of contact between the two pillars 17 and the orifice plate 11 may be substantially the same as the area of contact between the beam 16 of the present embodiment shown in FIGS. 4A and 4B and the orifice plate 11.

FIG. 6 is a diagram that shows stress ratios of stress exerted on the facing region 15 of the orifice plate 11 and flow rate ratios, compared among the three configurations in FIGS. 3A and 3B, FIGS. 4A and 4B, and FIGS. 5A and 5B.

Now, a simulation method for calculating each of the values is briefly described. First, a certain load was applied to the surface of the orifice plate 11, static analysis was carried out using the finite element method, and the maximum stress generated in the facing region 15 was found to use as a stress value. Then, the ratios of stress values obtained for the respective configurations to the stress value obtained for the configuration in FIGS. 3A and 3B were obtained as stress ratios of the respective configurations.

In addition, a three-dimensional model was created for each of the configurations in FIGS. 3A to 5B, and transient analysis was carried out using the finite element method in a system in which liquid was circulated from the liquid supply ports 8 to the liquid discharge ports 9. Then, a flow rate at an opening portion of the liquid supply port 8 on the functional layer 3 side was found to use as a flow rate value. Further, the ratios of flow rate values obtained for the respective configurations to the flow rate value obtained for the configuration in FIGS. 3A and 3B were obtained as flow rate ratios of the respective configurations.

Now, focusing on the stress ratios in FIG. 6, the stress ratio of the comparative example shown in FIGS. 5A and 5B is 0.9, whereas the stress ratio of the present embodiment is 0.7. In other words, the configuration of the present embodiment can make the stress smaller than the configuration of the comparative example shown in FIGS. 5A and 5B. This is because the beams 16 extending from the common flow channel walls 13 supported by the functional layer 3 and the substrate 1 can enhance mechanical strength more than the pillars 17 which are separated from the common flow channel walls 13.

On the other hand, focusing on the flow rate ratios, the flow rate of the configuration in FIGS. 5A and 5B provided with the pillars 17 showed a 3% decrease from the configuration in FIGS. 3A and 3B provided with no structures, whereas the flow rate of the configuration of the present embodiment provided with the beams 16 showed only a 2% decrease. This is because the beams 16 provided at positions away from the pressure chambers 5 can affect the flow of circulating liquid less than the pillars 17 provided at positions close to the pressure chambers 5. Details are described below.

Figure 7:
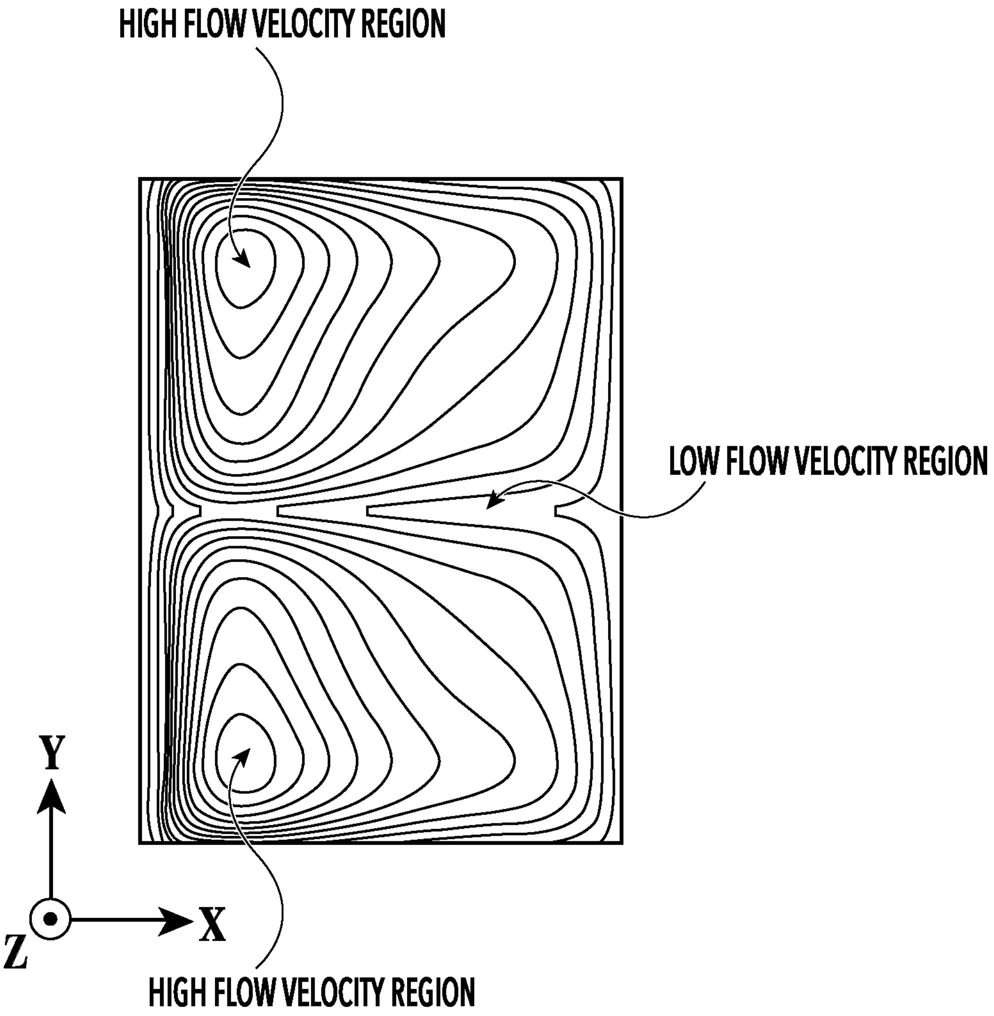
FIG. 7 is a diagram of an equal flow velocity distribution near a liquid supply port.

FIG. 7 is a diagram of an equal flow velocity distribution on an XY plane near the liquid supply port 8 in a case where liquid is circulated in the configuration in FIGS. 3A and 3B provided with no such structures as the beams 16 or the pillars 17. In FIG. 7, each line links points of equal flow velocity. The pressure chambers 5 are arranged on the left side of the diagram, and the common flow channel wall 13 is located on the right side of the diagram. Liquid flowing in in the Z-direction (the near side in FIG. 7) moves toward the pressure chambers 5 on the left side. The liquid supply port 8 supplies liquid not only to the pressure chambers 5 located immediately on the left, but also to the pressure chambers 5 located on the upper left and the lower left which are located between the liquid supply port 8 and each of the neighboring liquid supply ports 8. For this reason, the upper left region and the lower left region in the diagram are high flow velocity regions where liquid flows faster than in the other regions. Meanwhile, a region near the center line in the Y-direction is a low flow velocity region where liquid flows relatively slowly. Note that a flow velocity distribution for the liquid discharge port 9 is such that the left and right sides are inverted compared to the FIG. 7.

In a case where beams or pillars are additionally provided within such a flow velocity distribution, it is preferable that the beams or pillars be provided in regions with low flow velocity in order to affect the flow of liquid as little as possible. Thus, liquid to be supplied to the pressure chambers 5 can be affected less in a case where the beam 16 extending from the common flow channel wall 13 in the X-direction is provided at the center of the facing region 15 as in the present embodiment (FIGS. 4A and 4B) than a case where the two pillars 17 are provided at the center of the facing region 15 as in the comparative example (FIGS. 5A and 5B). Also, concerning the flow rate decreased by 2% by the provision of the beams 16 can be somewhat recovered by adjustments of e.g. the thicknesses of the substrate 1 and the functional layer 3, the shape and opening area of the liquid supply port 8 and the liquid discharge port 9, and further, output of liquid from the liquid circulation unit 504.

As described above, according to the present embodiment, the beam 16 is provided at the Y-direction center of each of the facing regions 15 corresponding to the liquid supply ports 8 and the liquid discharge ports 9, extending in the X-direction from the common flow channel wall 13 to the pressure chambers 5. This allows the strength of the orifice plate 11 to be enhanced more effectively than before without affecting the flow of circulating liquid so much.

In FIGS. 3A to 5B, the right opening as seen in the drawings is the liquid supply port 8 and the left opening as seen in the drawings is the liquid discharge port 9; however, it goes without saying that they can be reversed. Specifically, liquid supplied from the liquid circulation unit 504 may be caused to flow in from the left opening as seen in the drawings, move and flow from the left to the right as seen in the drawings, and flow out to the liquid circulation unit 504 through the right opening as seen in the drawings.

Second Embodiment

In the present embodiment, the beams are rightsized compared to the first embodiment.

Figure 8A:
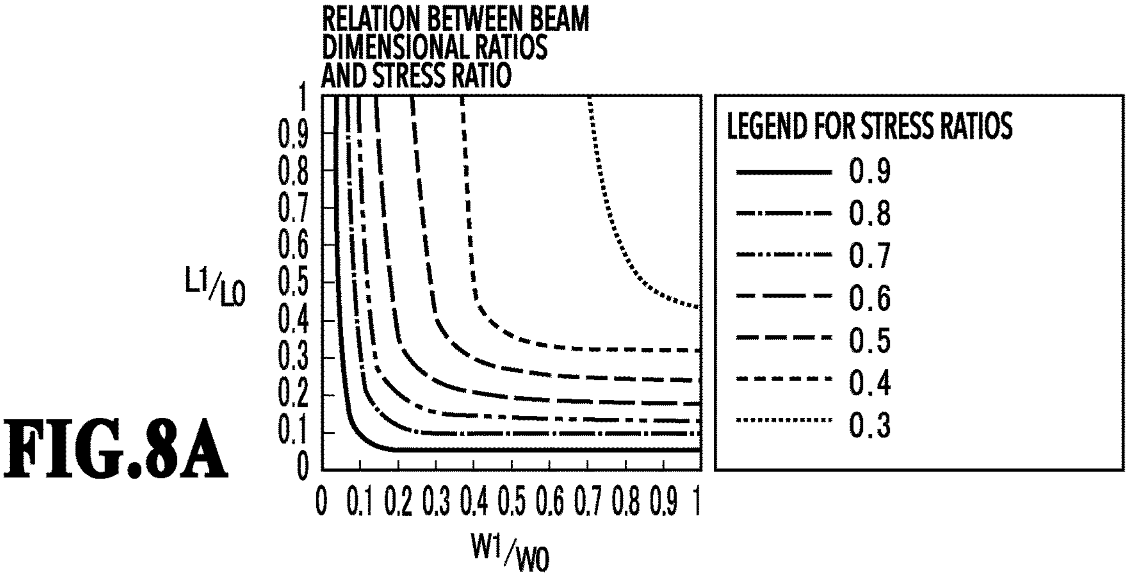
FIGS. 8A to 8C are diagrams showing the relations between beam dimensions and the stress ratio or the flow rate ratio.
Figure 8B:
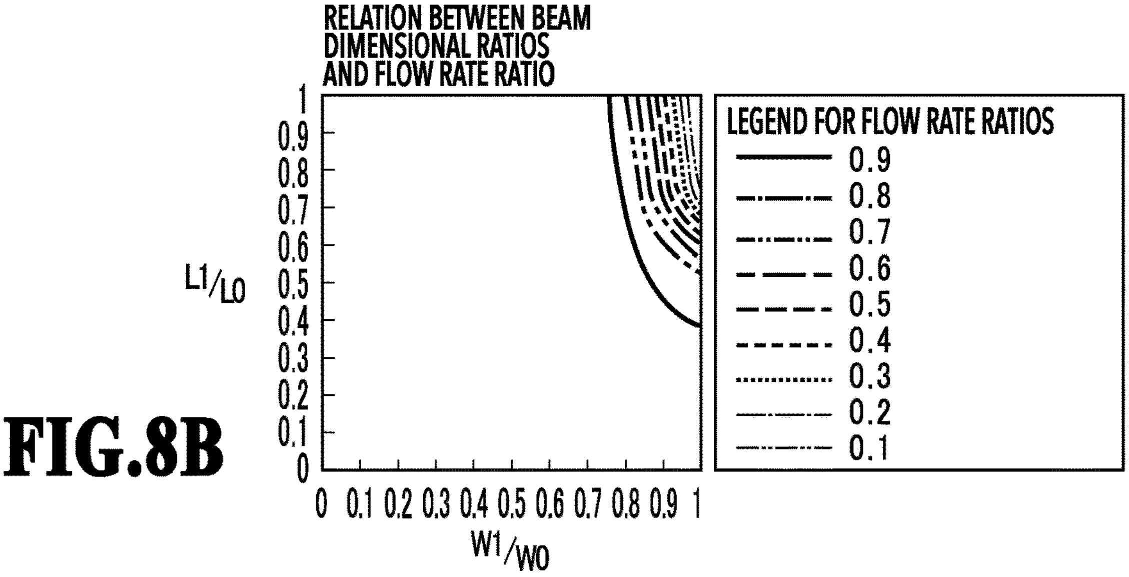
Figure 8C:
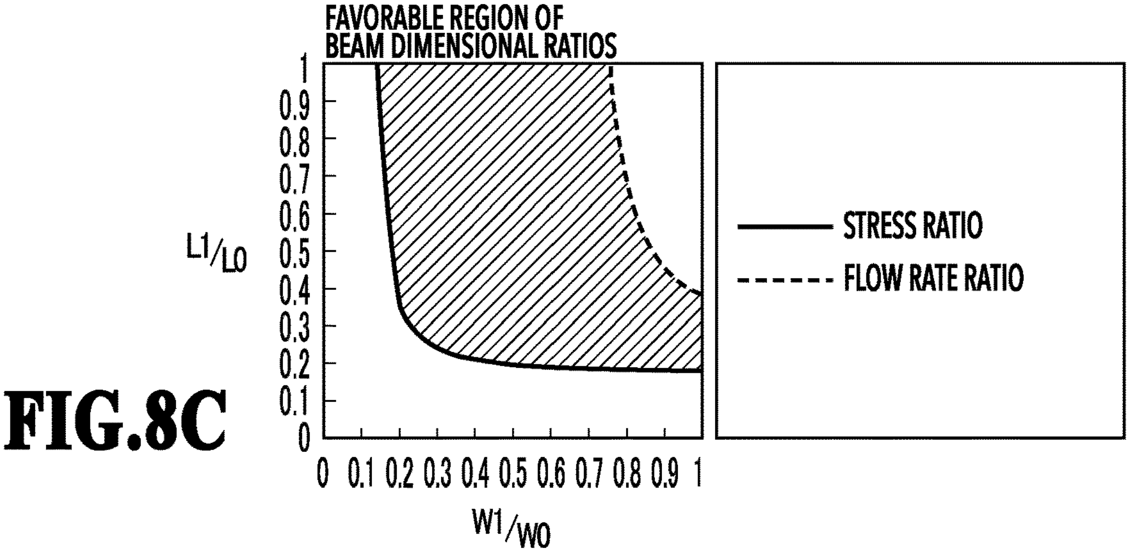

FIGS. 8A to 8C are diagrams showing the relations between beam size and stress ratio or flow rate ratio. The values are calculated in the same manner as described in connection with FIG. 6. In FIGS. 8A to 8C, the horizontal axis represents the ratio (W1/W0) of the length W1 of the beam 16 to the length W0 of the facing region 15 in the X-direction, and the vertical axis represents the ratio (L1/L0) of the length L1 of the beam to the length L0 of the facing region 15 in the Y-direction. The horizontal axis (L1/L0=0) and the vertical axis (W1/W0=0) themselves correspond to a stress ratio or a flow ratio of a case where the stress ratio or the flow rate ratio is 1, i.e., a case where no such structures as beams or pillars are provided in the facing regions.

FIG. 8A shows contour lines of the stress ratio. For example, the legend 0.9 represents dimensional conditions for a beam to obtain a stress ratio of 0.9. In other words, in a case where a beam is formed with dimensional ratios (W1/W0, L1/L0) corresponding to a given point on the solid line indicated by the legend 0.9, a stress ratio of 0.9 is obtained in the facing region 15 of the orifice plate 11. Then, a stress ratio between 0.9 and 1.0 is obtained in a case where a beam is formed with dimensional ratios corresponding to a region between the vertical and horizontal axes and the solid line of the legend 0.9.

In a case where the beam is formed with dimensional ratios corresponding to a certain point on a broken line indicate by the legend 0.8, a stress ratio of 0.8 is obtained in the facing regions 15 of the orifice plate 11. Then, a stress ratio between 0.8 and 0.9 is obtained in a case where a beam is formed with dimensional ratios corresponding to a region between the solid line of the legend 0.9 and the broken line of the legend 0.8. The same applies to the legends of 0.7 and below.

The graph in FIG. 8A shows that the larger the size (W1, L1) of the beam, the smaller the stress ratio, i.e., the higher the strength. However, the stress ratio becomes saturated at 0.3, and therefore the stress ratios that are above and on the right of the broken line indicated by the legend 0.3 are all 0.3.

Now, conditions for reducing the stress ratio compared to the comparative example illustrated in FIGS. 5A and 5B are considered. In this case, the stress ratio for the configuration in FIGS. 5A and 5B is 0.9 (see FIG. 6); hence, the beams may be formed with dimensional ratios corresponding to the region which is on the upper right side of the solid line of the legend 0.9.

Specifically, the following (Formula 1) may be satisfied.

$$L1/L0>7.5\times10^{\wedge}(-4)\times\exp((W0/W1)^{\wedge}0.6)+0.045 \quad \text{(Formula 1)}$$

Also, as can be seen in FIG. 8A, the intervals between the contour lines are narrow at the stress ratios 0.9 to 0.6. This means that manufacturing error greatly affects the stress ratio in a case where the beam is manufactured with a stress ratio of 0.6 or above. In this case, the strengths of the element substrates 20 may vary due to individual variability and lot-to-lot variability, making the life span of the liquid ejection head unstable. On the other hand, the intervals between the contour lines are wide in a region where the stress ratio is 0.6 or lower, which means that manufacturing error affects the stress ratio less in a case where the beam is manufactured with a stress ratio in this region and reduces variability in strength and life span. Judging from the above, it can be said that the beams are preferably formed in in a region where a stress ratio of 0.6 or below.

Specifically, the following Formula (2) may be satisfied.

$$L1/L0 \geq 9.4\times10^{\wedge}(-3)\times\exp((W0/W1)^{\wedge}0.7)+0.15 \qquad \text{(Formula 2)}$$

Next, a description is given on a preferable flow rate ratio. FIG. 8B shows contour lines of flow rate ratios. For example, the legend 0.9 represents dimensional conditions for a beam to obtain a flow rate ratio of 0.9. In other words, in a case where the beam is formed with dimensional ratios corresponding to a given point on the solid line indicated by the legend 0.9, a flow rate ratio of 0.9 is obtained in the facing region 15 of the orifice plate 11. Then, a flow rate ratio between 0.9 and 1.0 is obtained in a case where a beam is formed with dimensional ratios corresponding to a region between the vertical and horizontal axes and the solid line of the legend 0.9.

The legend 0.8 represents dimensional conditions for a beam to obtain a flow rate ratio of 0.8. In other words, in a case where a beam is formed with dimensional ratios corresponding to a given point on the broken line indicated by the legend 0.8, a flow rate ratio of 0.8 is obtained in the facing region 15 of the orifice plate 11. Then, a flow rate ratio between 0.8 and 0.9 is obtained in a case where a beam is formed with dimensional ratios corresponding to a region between the solid line of the legend 0.9 and the broken line of the legend 0.8. The same applies to the legends of 0.7 and below.

The graph in FIG. 8B shows that the larger the size (W1, L1) of the beam, the smaller the flow rate ratio. This is because the larger the beam, the higher the flow path resistance. It can also be seen that the flow rate ratio drastically decreases at 0.9 and below. This means that manufacturing error greatly affects the flow rate ratio in a case where the beam is manufactured with a flow rate ratio of 0.9 or below and that the ejection state varies due to individual variability and lot-to-lot variability of the element substrates 20.

Thus, from the perspective of the flow rate ratio, the beam is preferably formed with dimensions corresponding to a region which is below and on the left of the solid line of the legend 0.9.

Specifically, the following (Formula 3) may be satisfied.

$$L1/L0 \geq 7.5\times10^{\wedge}(-5)\times\exp(8\times W0/W1))+0.45) \qquad \text{(Formula 3)}$$

FIG. 8C is a diagram showing the region with favorable dimensional ratios for the beams from the perspectives of both the stress ratio and the flow rate ratio. The hatched region in FIG. 8C where the stress ratio is 0.6 or below and the flow rate ratio is 0.9 or above is a favorable region with preferable dimensional ratios of the beams. Beams created to fall within this region can effectively enhance the strength of the orifice plate 11 while achieving favorable ejection operation at the ejection ports.

With reference to FIG. 4A, a brief description is given here on the simulation conditions for finding FIGS. 8A to 8C. First, it is assumed that the facing region 15 is a square with the X-direction length W0 and the Y-direction length L0 equal to each other (W0/L0=1). Then, for non-square shapes (W0/L0≠1), values obtained by correcting actual measured dimensional ratios are used as the value for the vertical axis (L1/L0) and the value for the horizontal axis (W1/W0). Specifically, in a case where the actual measured dimensions are W0/L0<1, the ratio of actual measured dimensions in the X-direction (W1/W0) is a value for the horizontal axis, and the ratio of actual measured dimensions in the Y-direction (L1/L0) multiplied by (W0/L0) is a value for the vertical value. In a case where W0/L0>1, the ratio of actual measured dimensions in the X-direction (W1/W0) multiplied by (L0/W0) is a value for the horizontal axis, and the ratio of actual measured dimensions in the Y-direction (L1/L0) is a value for the vertical value. The present embodiment (FIGS. 4A and 4B) corresponds to the former case (W0/L0<1).

Figure 9A:
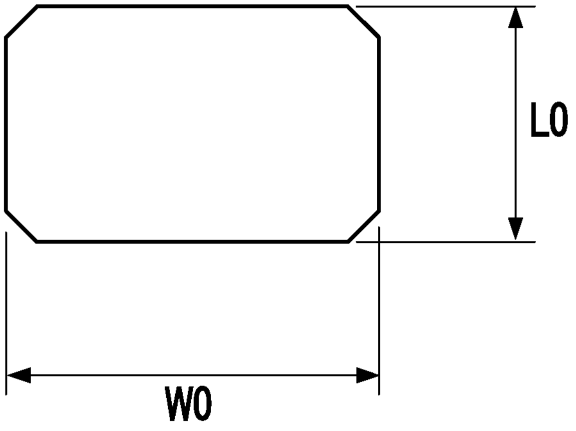
FIGS. 9A and 9B are diagrams showing a modification of the shape of the liquid supply port and a liquid discharge port.
Figure 9B:
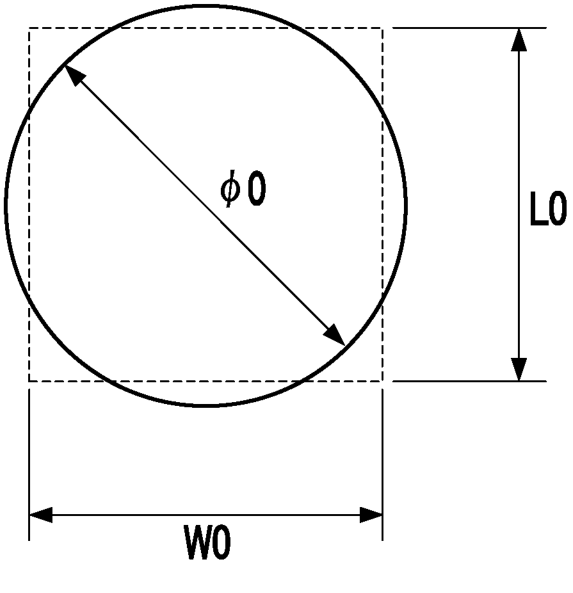

In this case, the shapes of the liquid supply port 8 and the liquid discharge port 9 do not have to be exactly rectangular. For example, they may be a shape with its four corners trimmed off as shown in FIG. 9A or may be circular as shown in FIG. 9B. In the case of FIG. 9A, the facing region 15 may be defined by the maximum width W0 in the X-direction and the maximum width L0 in the Y-direction of the opening. In the case of FIG. 9B, the facing region 15 may be defined such that the length of a side of a square whose area is equal to that of the circular opening may be W0=L0. However, considering the wiring for the heaters in the functional layer 3, the shapes of the liquid supply port 8 and the liquid discharge port 9 are preferably simple polygons.

Figure 10A:
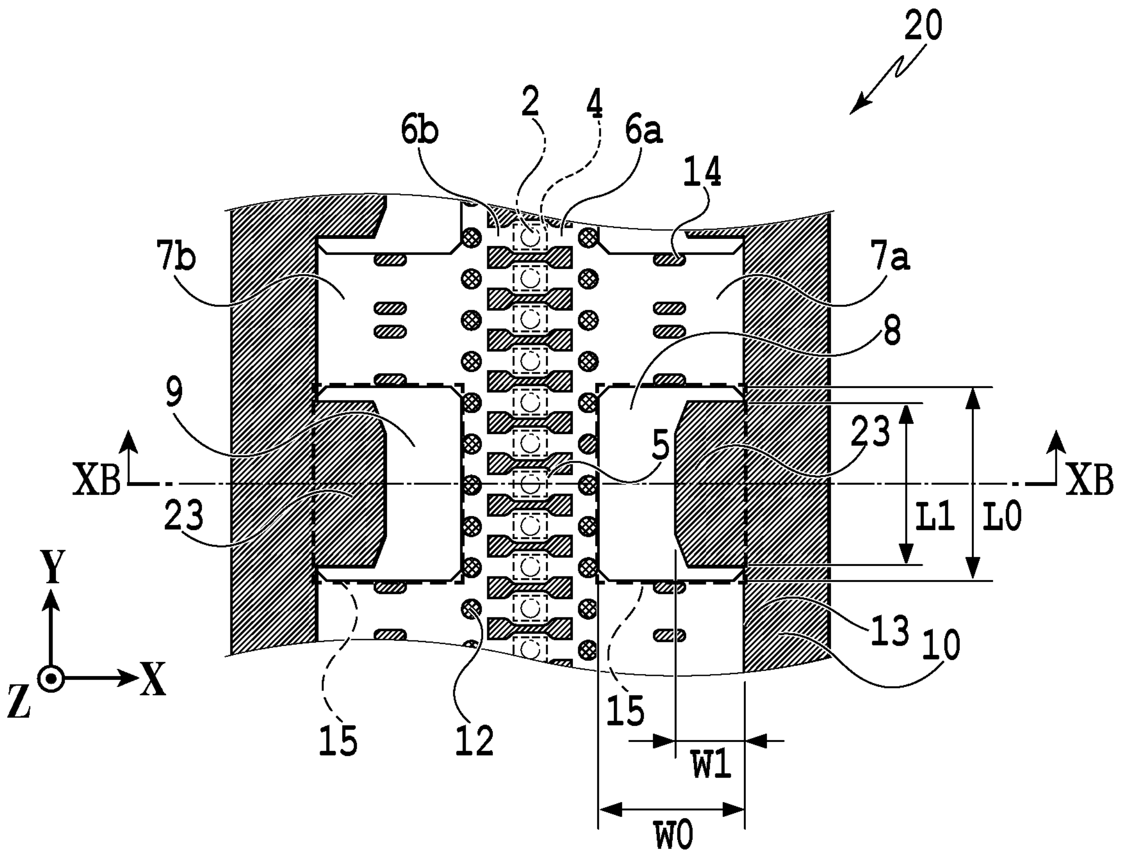
FIGS. 10A and 10B are diagrams illustrating the structure of an element substrate of a second embodiment.
Figure 10B:
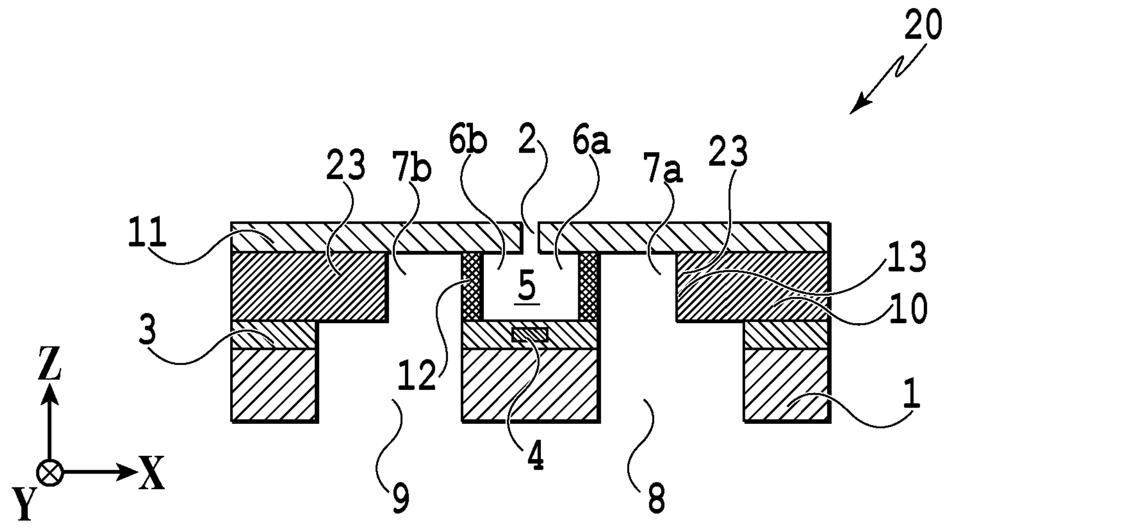

FIGS. 10A and 10B are diagrams illustrating the structure of the element substrate 20 of the present embodiment in which beams 23 satisfying the above conditions are provided. FIG. 10A is a plan view seen from the ejection ports 2 side, and FIG. 10B is a sectional view. Compared with the structure of the first embodiment shown in FIGS. 4A and 4B, the size of the facing region 15 is the same, but the size of the beam 23 is different. In the present embodiment, the X-direction length W1 and the Y-direction length L1 of each beam 23 are 38 μm and 85 μm, respectively.

In this case, in FIGS. 8A to 8C, the value for the horizontal axis (W1/W0) is 0.51 (=38/75), and the value for the vertical axis (L1/L0) is 0.63 (=85/101×(75/101)). Hence, based on FIG. 8A, the stress ratio is between 0.3 and 0.4, and based on FIG. 8B, the flow rate ratio is between 0.9 and 1.0. Thus, according to the structure of the present embodiment shown in FIGS. 10A and 10B, the size of the beams 23 falls within the hatched favorable region shown in FIG. 8C.

On the other hand, in the first embodiment where the size of the beams 16 is such that W1=31 μm and L1=20 μm, the value for the horizontal axis (W1/W0) is 0.41 (=31/75) and the value for the vertical axis (L1/L0) is 0.15 (=20/101×(75/101)). Then, a plot of this coordinates on FIG. 8C does not fall within the hatched favorable region.

Thus, the present embodiment can effectively enhance the strength of the orifice plate 11 even more than the first embodiment by providing the beams 23 that fall within the favorable region shown in FIG. 8C.

Third Embodiment

Figure 11A:
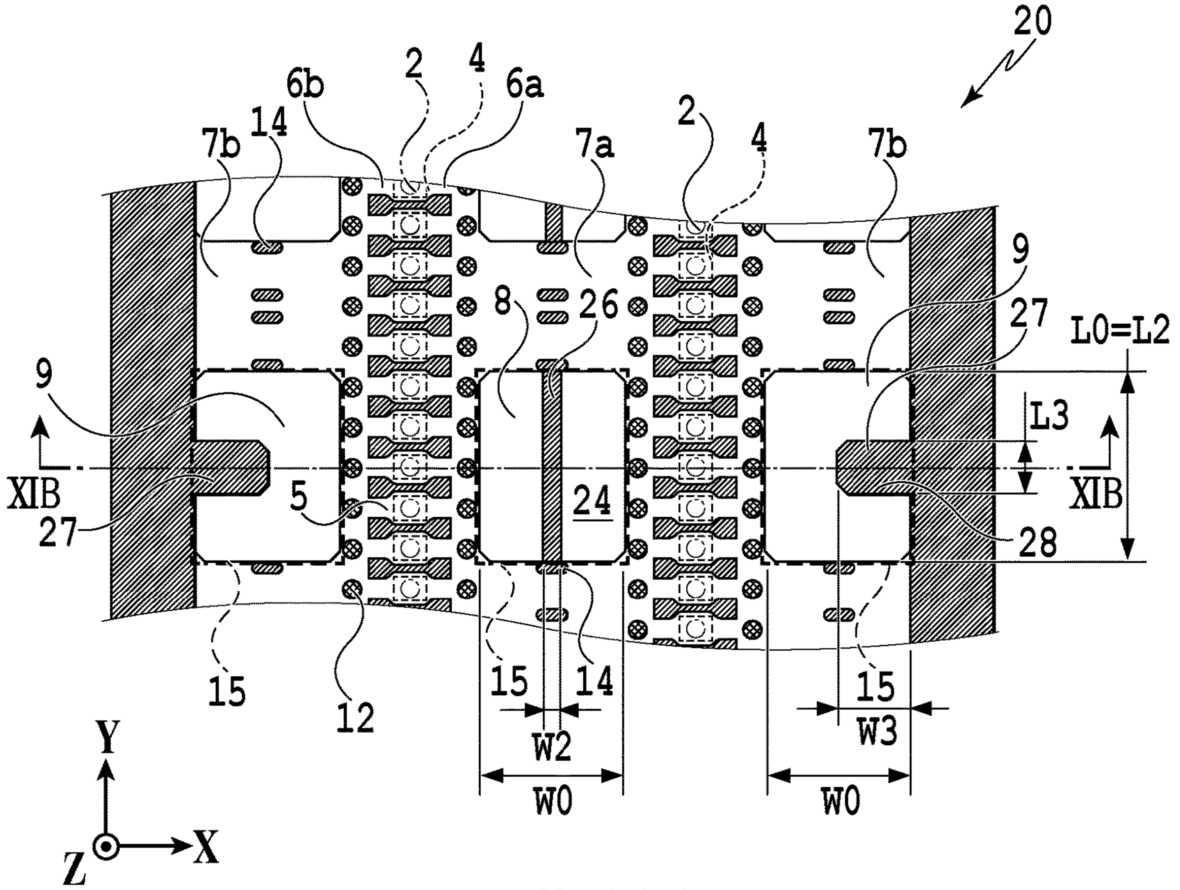
FIGS. 11A and 11B are diagrams illustrating the structure of an element substrate of a third embodiment.
Figure 11B:
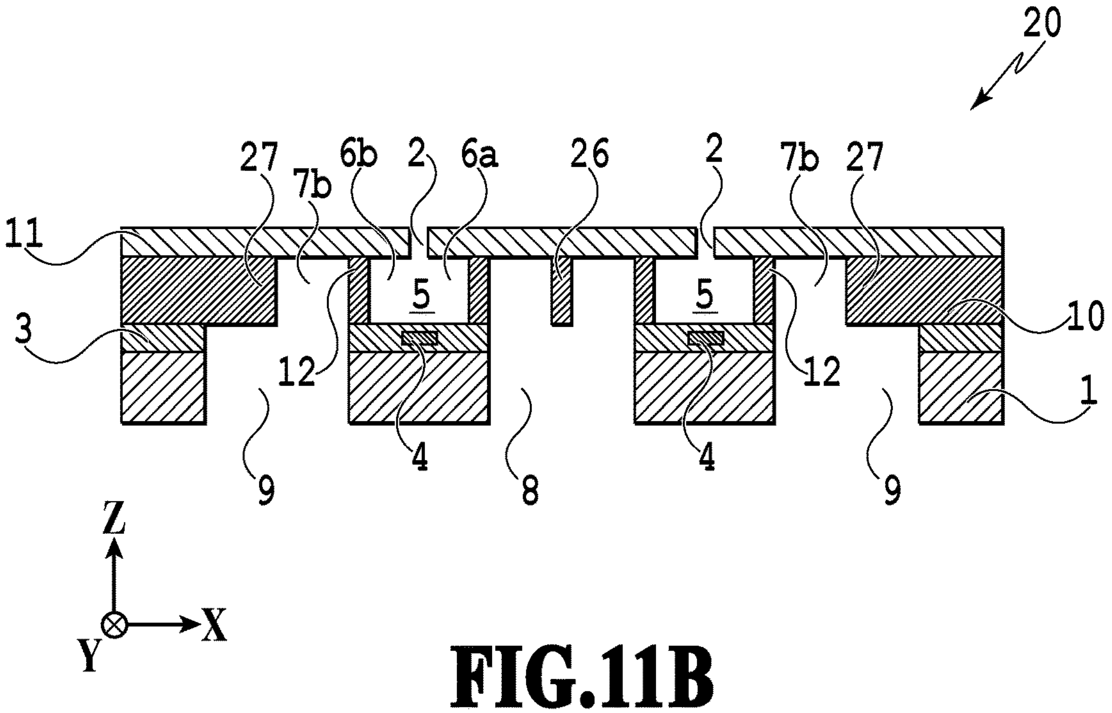

FIGS. 11A and 11B are diagrams illustrating the structure of the element substrate 20 of the present embodiment. FIG. 11A is a plan view seen from the ejection ports 2 side, and FIG. 11B is a sectional view. The same reference numerals as those in FIGS. 4A and 4B denote the same members as those in FIGS. 4A and 4B.

In the element substrate 20 of the present embodiment, there are two rows of heaters 4 and two rows of ejection ports 2, which are in parallel with each other in the X-direction which intersects with the direction in which they are arranged. The common flow channel 7*a* is disposed between the two rows of ejection ports to supply liquid to each of the rows of ejection ports in a shared manner, and the common flow channels 7*b* are disposed on the outer sides of the respective two rows of ejection ports to eject liquid from each of the rows of ejection ports. The common flow channel 7*a* communicates with the liquid supply ports 8 which is for supplying liquid from the liquid circulation unit 504, and the common flow channels 7*b* communicate with the liquid discharge ports 9 for discharging liquid to the liquid circulation unit 504.

Under the above configuration, liquid supplied through the liquid supply ports 8 passes through the common flow channel 7*a* and then the individual flow channels 6*a* and is disposed in the pressure chambers 5 in the two rows. Then, film boiling is caused in the ink in the pressure chambers 5 in response to application of voltage to the heaters 4 in accordance with ejection data, and ink droplets are ejected from the ejection ports 2 due to the energy of the generated bubbles growing. Ink unused for ejection passes through the individual flow channels 6*b* and then the common flow channels 7*b* and is collected by the liquid circulation unit 504 through the liquid discharge ports 9 disposed on both sides.

In the common flow channel 7*a* of the present embodiment, a first beam 26 extending in the Y-direction is provided in each region corresponding to the facing region 15. The X-direction length W2 and the Y-direction length L2 of the first beam 26 are 9 μm and 101 μm, respectively. In the respective two common flow channels 7*b* for liquid discharge, second beams 27 are provided symmetrically, extending in the X-direction from the common flow channel walls 13 toward the pressure chambers 5. The X-direction length W3 and the Y-direction length L3 of each second beam 27 are 38 μm and 30 μm, respectively. The first beams 26 and the second beams 27 may be formed of the same member as the flow channel forming layer 10 or may be formed of a different member.

FIG. 12 is a diagram comparing the stress ratio of stress exerted on the facing region 15 between a case where the first beams 26 and the second beams 27 are provided and a case where they are not provided. The values are calculated in the same manner as described in connection with FIG. 6. The ratio of a stress value obtained for a configuration provided with the first beams 26 to a stress value for a configuration provided with no beams and the ratio of a stress value obtained for a configuration provided with the second beams 27 to a stress value for a configuration provided with no beams are shown as stress ratios. According to FIG. 12, relative to the configuration provided with no beams, the stress ratio is 0.61 for the configuration provided with the first beams 26 and is 0.58 for the configuration provided with the second beams 27. It can be therefore seen that the provision of the first beams 26 or the second beams 27 reduces the stress on the facing regions 15 and enhances the strength of the orifice plate 11.

Although the configuration described above is such that liquid is supplied through the liquid supply ports 8 at the center and is discharged through the liquid discharge ports 9 at the sides, the flow of liquid can be reversed in the element substrate 20 of the present embodiment. Specifically, liquid supplied from the liquid circulation unit 504 may flow into the element substrate 20 through the openings at the sides (the liquid discharge ports 9) and flow out through the openings at the center (the liquid supply ports 8).

FIG. 13 is a diagram showing the relation between the flow direction in the element substrate 20 and flow velocity ratio. The flow velocity ratios in FIG. 13 show the ratio of the maximum flow velocity to the minimum flow velocity of liquid flowing near the ejection ports 2. The closer to 1 the value of the flow velocity ratio is, the smaller the flow velocity variability of liquid flowing near the ejection ports 2 is, meaning that the flow is stable. The flow velocities were obtained by creating a three-dimensional model of the configuration shown in FIGS. 11A to 11B and carrying out transient analysis using the finite element method.

As can be seen in FIG. 13, the flow velocity ratio is 0.94 in a case where liquid flows in through the liquid supply ports 8 and is discharged through the liquid discharge ports 9 and is 0.90 in a case where the liquid flows in the opposite direction. This means that, in the element substrate 20 of the present embodiment, supplying liquid through the liquid supply ports 8 at the center and discharging the liquid through the liquid discharge ports 9 at the sides can stabilize the flow velocity of fluid flowing near the ejection ports 2 more. However, the present embodiment is not limited to such direction of flow. The effect of enhancing the strength of the orifice plate 11 can be well obtained even with a configuration in which liquid flows in through the liquid discharge ports 9 (openings) at the sides and is discharge through the liquid supply ports 8 (openings) at the center.

As described above, according to the present embodiment, the first beam 26 extending in the Y-direction is provided for the facing region 15 corresponding to the opening at the center, and the second beams 27 extending in the X-direction from the respective common flow channel walls 13 toward the pressure chambers 5 are provided for the respective facing regions 15 corresponding to the two openings at the sides. This allows the strength of the orifice plate 11 to be enhanced more effectively than before without affecting the flow of circulating liquid so much.

In the above description, the X-direction length W2 and the Y-direction length L2 of the first beam 26 are 9 μm and 101 μm, respectively. In other words, the length of the first beam 26 covers the Y-direction length of the facing region 15. However, it goes without saying that such values can be changed as needed.

Figure 14A:
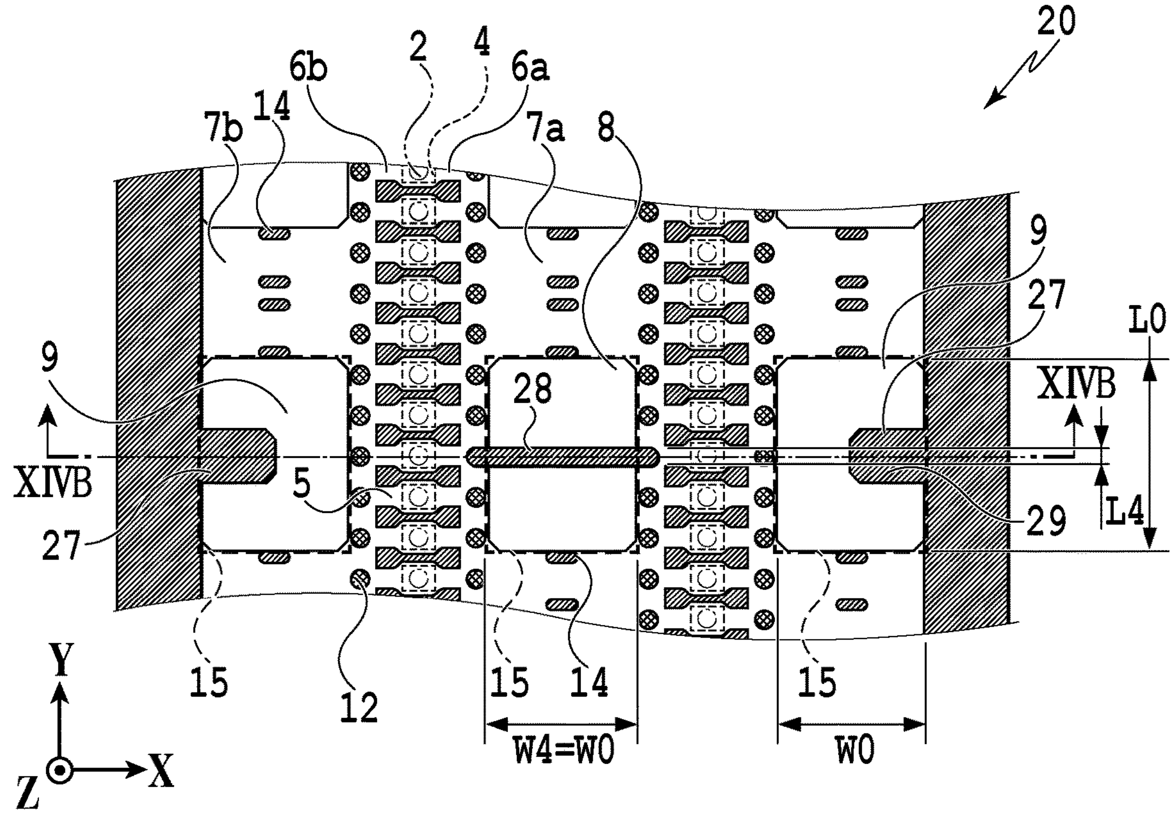
FIGS. 14A and 14B are diagrams showing another example of a first beam.
Figure 14B:
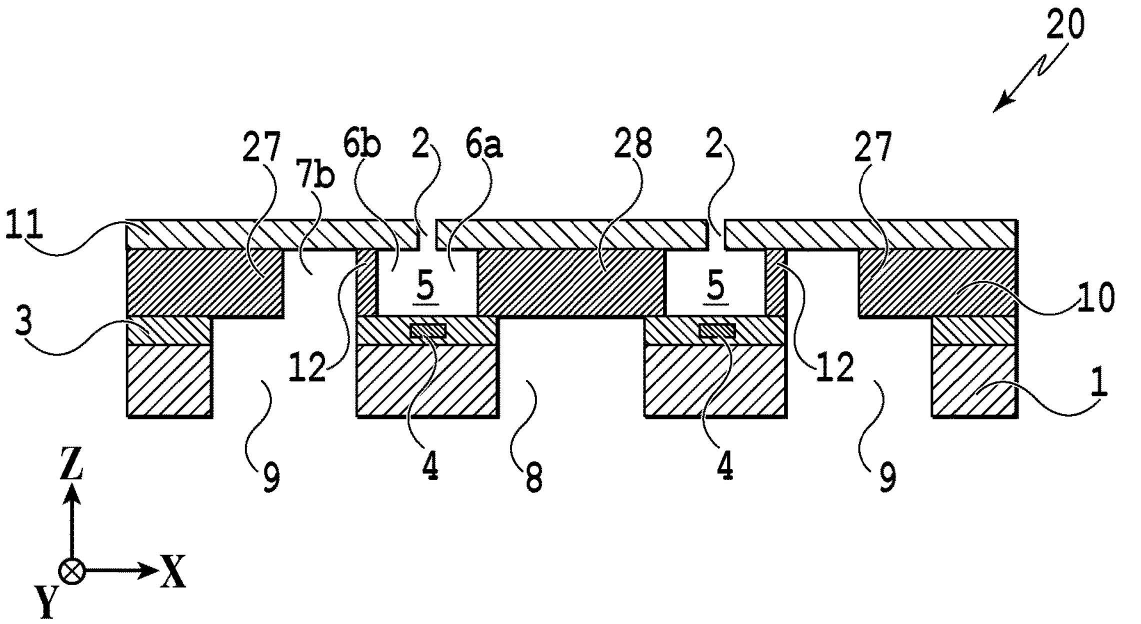

FIGS. 14A and 14B are diagrams showing another example of a first beam. In this example, the X-direction length W4 and the Y-direction length L4 of a first beam 28 are 75 μm and 9 μm, respectively, and the first beam 28 is integral with the filters 12 at its ends in the X-direction. Compared with the shape of the first beam 26 illustrated in FIGS. 13A and 13B, the first beam 28 increases the stress ratio but can decrease the flow velocity ratio.

Figure 15:
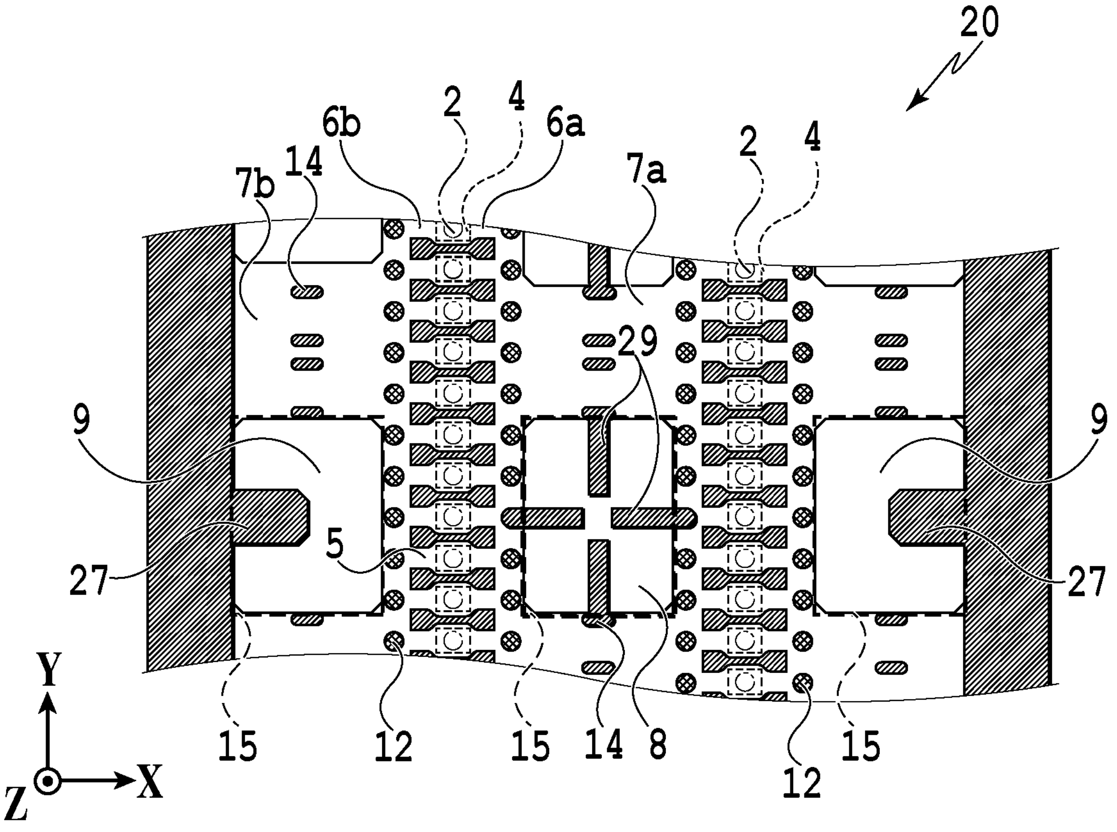
FIG. 15 is a diagram showing yet another example of a first beam.

FIG. 15 is a diagram showing yet another example of a first beam of the present embodiment. A first beam 29 in this example has two beams extending in ±X directions and two beams extending in ±Y directions from the center of the facing region 15. Such provision of a plurality of beams in a single facing region 15 increases the flow velocity ratio, but can decrease the stress ratio.

In the present embodiment, any of the configurations in FIGS. 11A, 11B, 14A, 14B, and 15 can be employed. As for the second beams 27, they do not necessarily have to be provided symmetrically. In any case, preferably, the shapes and sizes of the beams are adjusted appropriately such that the stress ratio and the flow rate ratio fall within an appropriate range.

Other Embodiments

The above embodiments describe beams that are substantially rectangular. However, the shape of the beams can be variously modified.

Figure 16A:
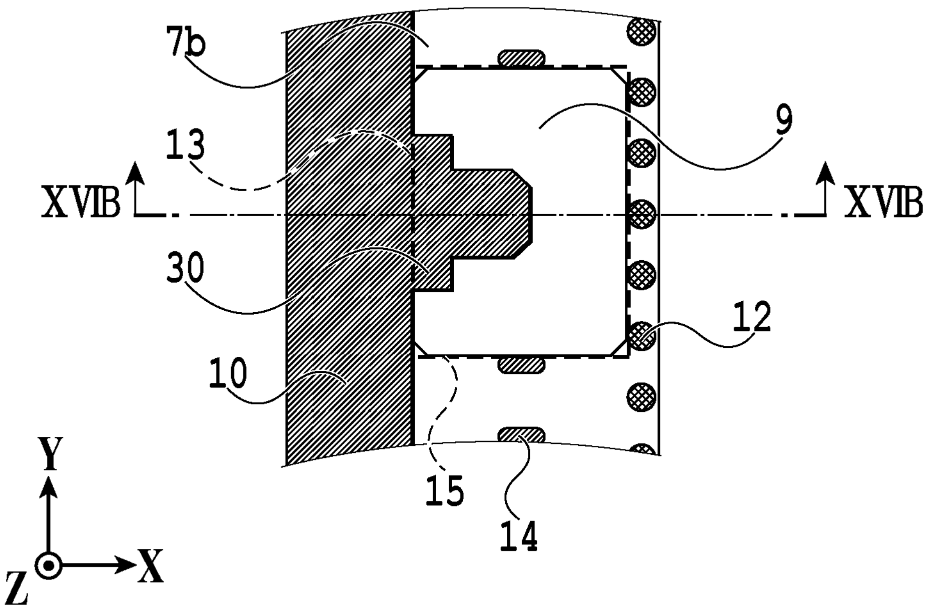
FIGS. 16A and 16B are diagrams showing a first modification.
Figure 16B:
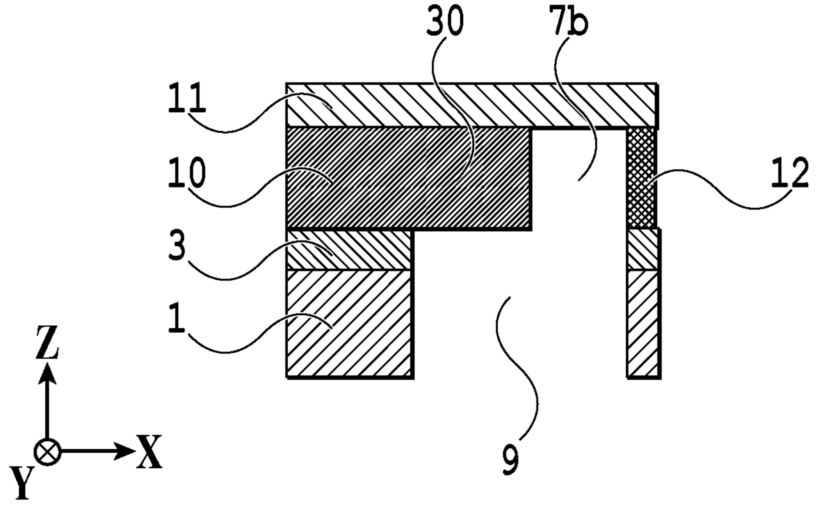

FIGS. 16A and 16B are diagrams showing a first modification. FIG. 16A is a plan view seen from the ejection ports 2 side, and FIG. 16B is a sectional view. FIGS. 16A and 16B both show an enlarged part of the facing region 15 of the element substrate 20. A beam 30 of the first modification is wider on the common flow channel wall 13 side than the beam 16 of the first embodiment illustrated in FIGS. 4A and 4B. The beam shape of this example can decrease stress even more while maintaining the same level of flow velocity ratio as that in FIGS. 4A and 4B.

Figure 17A:
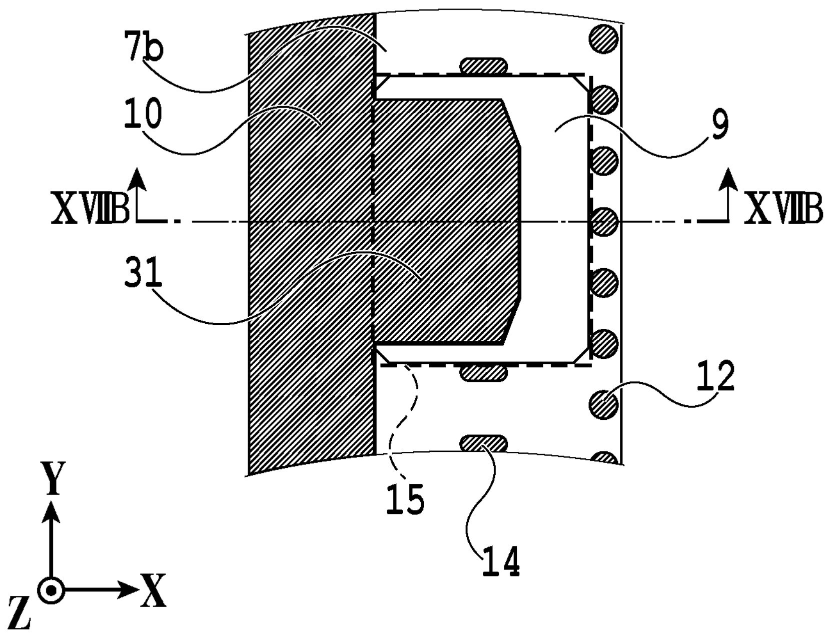
FIGS. 17A and 17B are diagrams showing a second modification.
Figure 17B:
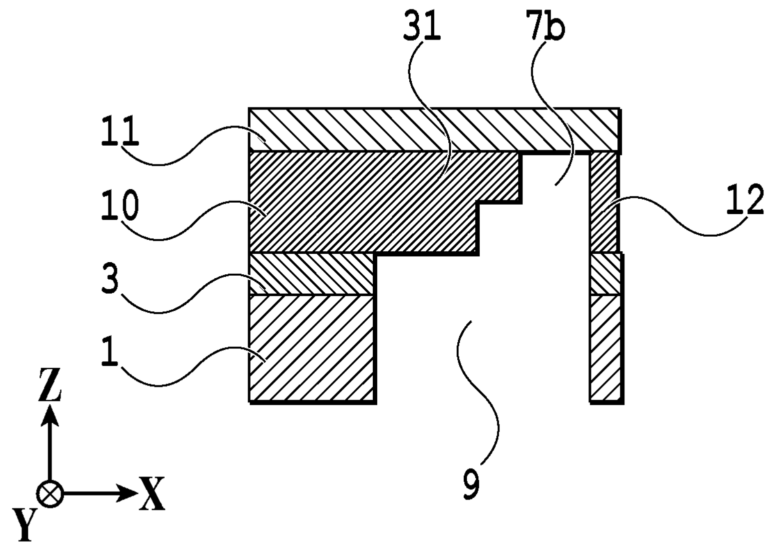

FIGS. 17A and 17B are diagrams showing a second modification. FIG. 17A is a plan view seen from the ejection ports 2 side, and FIG. 17B is a sectional view. FIGS. 17A and 17B both show an enlarged part of the facing region 15 of the element substrate 20. A beam 31 of the second modification is longer in the Y-direction to have a larger area of contact with the orifice plate 11 (see FIG. 17A) than the beam 16 of the first embodiment illustrated in FIGS. 4A and 4B. Meanwhile, the thickness of the beam 31 in the Z-direction is thinner on the side close to the pressure chambers 5 (see FIG. 17B). While the strength of the orifice plate 11 is enhanced by the increase in the area of contact with the orifice plate 11, there is a concern that the decrease in the volume of the common flow channel 7*b* lowers the flow rate. Making the thickness of the beam 31 thin in stages toward the pressure chambers 5 like in the present example can promote the flow from the liquid supply ports 8 to the individual flow channels 6*a* and the flow from the individual flow channels 6*b* to the liquid discharge ports 9.

The entire region of each of the beams described above is included in the facing region 15 on the XY plane, but the beam may extend beyond the facing region 15.

Figure 18A:
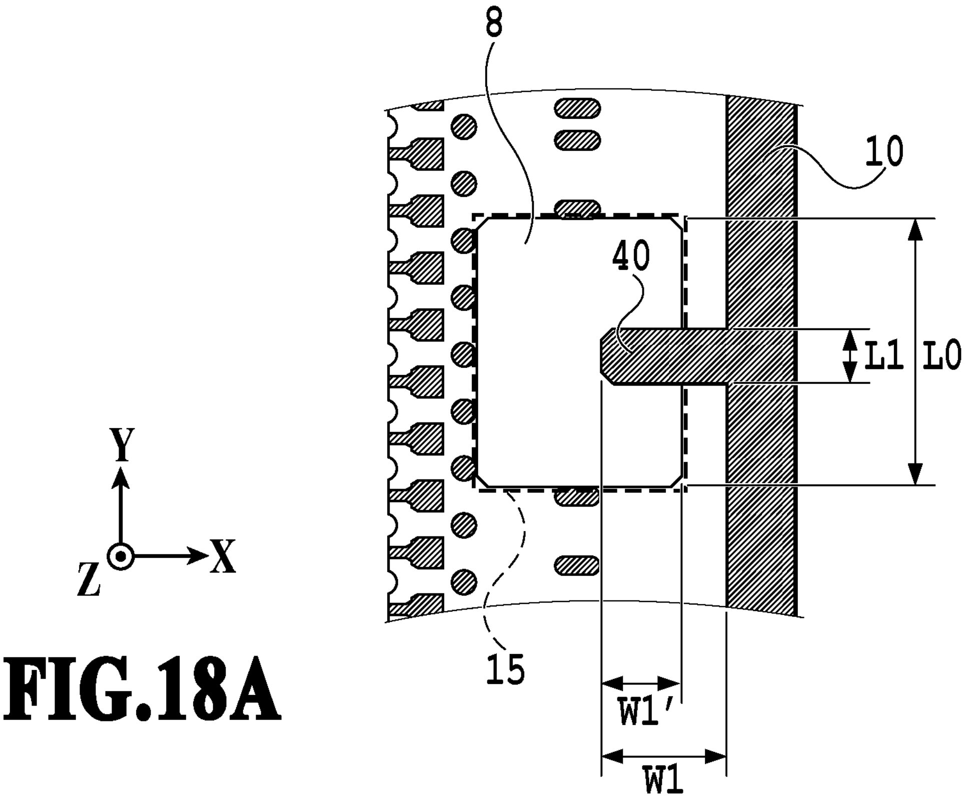
FIGS. 18A and 18B are diagrams showing an example of a beam extending beyond a facing region.
Figure 18B:
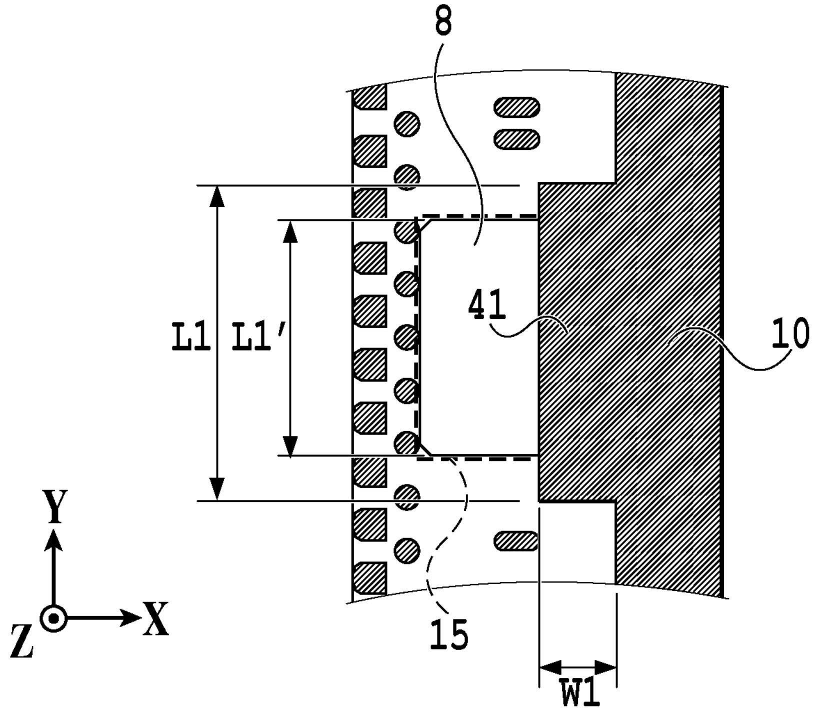

FIG. 18A shows a mode where part of a beam 40 extends beyond the facing region 15 in the X-direction. In such a case, for the flow rate ratio illustrated in FIG. 8B, the dimension W1 of the beam 40 in the X-direction may be replaced with the dimension W1' of a part of the beam 40 included in the facing region 15 so that the value for the horizontal axis may be (W1'/W0). FIG. 18B shows a mode where part of a beam 41 extends beyond the facing region 15 in the Y-direction. In such a case, for the flow rate ratio illustrated in FIG. 8B, the dimension L1 of the beam 41 in the Y-direction may be replaced with the dimension L1' of a part of the beam 41 included in the facing region 15 so that the value for the vertical axis may be (L1'/L0).

As an example, the above describes a liquid ejection head configured such that film boiling is caused in ink in the pressure chambers in response to application of voltage to the heaters and ink droplets are ejected from the ejection ports due to the energy of the generated bubbles growing. However, a configuration for ink ejection is not limited to the above. For example, piezoelectric elements that change in volume in response to application of voltage may be disposed instead of heaters to eject liquid from the ejection ports in response to the volume change of the piezoelectric elements. In any case, the advantageous effects offered by the above embodiments can be obtained as long as energy generating elements that generate energy for ink ejection are disposed at positions corresponding to the pressure chambers.

Further, although the embodiments described above assume a configuration in which liquid is circulated between the element substrate 20 and the liquid circulation unit 504, circulating liquid inside the liquid ejection head 100 is not an essential requirement. Like Japanese Patent Laid-Open No. 2018-108691, a liquid ejection head may be configured not to discharge ink unused for ejection, but to only add liquid through the liquid supply ports by an amount consumed by the ejection operation. In this case, for example in the configuration in FIGS. 4A and 4B, the two openings described as both of the liquid supply port 8 and the liquid discharge port 9 may be used as openings for supplying liquid. In the configuration in FIGS. 11A and 11B, the openings 9 at both sides and the openings 8 at the center may all be used as openings for supplying liquid. However, in a configuration such that liquid is circulated inside the liquid ejection head 100 as in the above-described embodiments, the state of the flow of liquid in the element substrate 20 greatly affects the ejection performance of the liquid ejection head, and therefore, it can be said that the provision of the beams can offer further advantageous effects.

Although a full-line inkjet printing apparatus is described above using FIGS. 1A to 2 as an example, it goes without saying that the element substrate 20 described in the above embodiments is usable for a liquid ejection head employed in a serial inkjet printing apparatus. In a case of a serial inkjet printing apparatus, the liquid ejection head may have a configuration in which only one element substrate 20 is disposed or two or more element substrates 20 are disposed.

In any case, in an element substrate including a flow channel through which liquid is supplied to a plurality of pressure chambers, providing beams that support an orifice plate in regions corresponding to openings for supplying liquid enables favorable ejection operation to be performed while enhancing the strength of the orifice plate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A liquid ejection module comprising:

a first layer which has a plurality of energy generating elements arranged in a first direction and a plurality of first openings arranged in the first direction and disposed at a position apart from a row of the plurality of energy generating elements in a second direction which is parallel to the first layer and intersects with the first direction;

a flow channel forming layer which is provided on the first layer and has a plurality of pressure chambers disposed at positions corresponding to the respective energy generating elements, first individual flow channels which communicate with the respective pressure chambers, a first common flow channel which communicates with the first openings and connects to the plurality of first individual flow channels in a shared manner, and a first flow channel wall which forms the first common flow channel and extends in the first direction; and an orifice plate which is provided on the flow channel forming layer and has a plurality of ejection ports that communicate with the respective pressure chambers, wherein liquid supplied through the first openings pass through the first common flow channel and the first individual flow channels, is disposed in the pressure chambers, and is ejected from the ejection ports in response to an application of voltage to the respective energy generating element, wherein in the second direction, a row of the first openings is located between the first flow channel wall and the plurality of ejection ports, wherein in the first common flow channel of the flow channel forming layer, at least one beam is formed which extends in the second direction from the first flow channel wall of the first common flow channel toward the first individual flow channels and supports the orifice plate in a region overlapping the first opening in view from a liquid ejection direction, and wherein an end portion of the beam in the second direction is located in the region, in view from a liquid ejection direction.

2. The liquid ejection module according to claim 1, wherein the beam is located at a center of the first opening in the first direction and has a shape which is symmetrical in the first direction.

3. The liquid ejection module according to claim 2, wherein the first opening and the beam each have a shape such that a length thereof in the first direction is longer than a length thereof in the second direction.

4. The liquid ejection module according to claim 1, wherein the following relation is satisfied:

$$L1/L0>7.5\times10^{\wedge}(-4)\times\exp((W0/W1)^{\wedge}0.6)+0.045,$$

where L0 is a dimension of the first opening in the first direction, L1 is a dimension of the beam in the first direction, W0 is a dimension of the first opening in the second direction, and W1 is a dimension of the beam in the second direction.

5. The liquid ejection module according to claim 1, wherein the following relation is satisfied:

$$L1/L0\leq0.75\times(2\times10^{\wedge}(-5)\times\exp(8\times(W0/W1))+0.45)$$

where L0 is a dimension of the first opening in the first direction, L1 is a dimension of the beam in the first direction, W0 is a dimension of the first opening in the second direction, and W1 is a dimension of the beam in the second direction.

6. The liquid ejection module according to claim 1, wherein the flow channel forming layer also has a plurality of second individual flow channels communicating with the respective pressure chambers, a second common flow channel connecting to the plurality of second individual flow channels in a shared manner, and a second flow channel wall which forms the second common flow channel and extends in the first direction, the first layer also has a plurality of second openings arranged in a first direction and communicating with the second common flow channel, and in the second common flow channel of the flow channel forming layer, at least one second beam is formed which extends in the second direction from the second flow channel wall of the second common flow channel toward the second individual flow channels and supports the orifice plate in a region facing the second opening.

7. The liquid ejection module according to claim 6, wherein the first opening, the first common flow channel, and the first individual flow channels and the second opening, the second common flow channel, and the second individual flow channels are arranged symmetrically in the second direction across an array of the plurality of energy generating elements.

8. The liquid ejection module according to claim 6, wherein liquid is collected from the pressure chambers through the second individual flow channels, the second common flow channel and the second opening passes.

9. The liquid ejection module according to claim 6, wherein the second beam is formed in the first direction, spanning the second opening.

10. The liquid ejection module according to claim 1, wherein at least one of a width of the beam in the first direction and a thickness of the beam in a direction in which liquid is ejected from the ejection ports decreases in stages from a flow channel wall of the first common flow channel toward the first individual flow channels.

11. The liquid ejection module according to claim 1, wherein the beam extends beyond the region facing the first opening in the second direction.

12. The liquid ejection module according to claim 1, wherein the energy generating elements are heaters.

13. The liquid ejection module according to claim 1, further comprising a substrate which is provided under the first layer and supports the first layer, the flow channel forming layer, and the orifice plate.

14. The liquid ejection module according to claim 1, wherein the plurality of ejection ports are arranged on the orifice plate in the first direction at a density of 1200 dpi (dots per inch).

15. The liquid ejection module according to claim 1, wherein the flow channel forming member and the orifice plate are integrally formed.

16. A liquid ejection head in which a plurality of liquid ejection modules are arranged in a first direction, each of the liquid ejection modules comprising:

a first layer which has a plurality of energy generating elements arranged in a first direction and a plurality of first openings arranged in the first direction and disposed at a position apart from a row of the plurality of energy generating elements in a second direction which is parallel to the first layer and intersects with the first direction;

a flow channel forming layer which is provided on the first layer and has a plurality of pressure chambers disposed at positions corresponding to the respective energy generating elements, first individual flow channels which communicate with the respective pressure chambers, a first common flow channel which communicates with the first opening and connects to the plurality of first individual flow channels in a shared manner, and a first flow channel wall which forms the first common flow channel and extends in the first direction; and an orifice plate which is provided on the flow channel forming layer and has a plurality of ejection ports that communicate with the respective pressure chambers, the liquid ejection module being configured such that liquid supplied through the first opening passes through the first common flow channel and the first individual flow channels, is disposed in the pressure chambers, and is ejected from the ejection ports in response to an application of voltage to the respective energy generating element in accordance with ejection data, wherein in the second direction, a row of the first openings is located between the first flow channel wall and the plurality of ejection ports, in the first common flow channel of the flow channel forming layer, at least one beam is formed which extends in the second direction from the first flow channel wall of the first common flow channel toward the first individual flow channels and supports the orifice plate in a region overlapping the first opening in view from a liquid ejection direction, and wherein an end portion of the beam in the second direction is located in the region, in view from a liquid ejection direction.

17. A liquid ejection module comprising:

a first layer which has a plurality of energy generating elements arranged in a first direction and a plurality of first openings arranged in the first direction and disposed at a position apart from a row of the plurality of energy generating elements in a second direction which is parallel to the first layer and intersects with the first direction;

a flow channel forming layer which is provided on the first layer and has a plurality of pressure chambers disposed at positions corresponding to the respective energy generating elements, first individual flow channels which communicate with the respective pressure chambers, a first common flow channel which communicates with the first opening and connects to the plurality of first individual flow channels in a shared manner, and a first flow channel wall which forms the first common flow channel and extends in the first direction; and an orifice plate which is provided on the flow channel forming layer and has a plurality of ejection ports that communicate with the respective pressure chambers, wherein liquid supplied through the first opening passes through the first common flow channel and the first individual flow channels, is disposed in the pressure chambers, and is ejected from the ejection ports in response to an application of voltage to the respective energy generating element, wherein in the second direction, a row of the first openings is located between the first flow channel wall and the plurality of ejection ports, wherein the first common flow channel of the flow channel forming layer, at least one beam is formed which extends in the second direction and supports the orifice plate in a region overlapping the first opening in view from a liquid ejection direction, wherein the beam is located at a center of the first opening in the first direction and has a shape which is symmetrical in the first direction, and wherein an end portion of the beam in the second direction is located in the region, in view from a liquid ejection direction.

* * * * *